United States Patent
Gupta et al.

(10) Patent No.: US 10,678,494 B2
(45) Date of Patent: *Jun. 9, 2020

(54) CONTROLLING DATA STREAMS IN UNIVERSAL SERIAL BUS (USB) SYSTEMS

(71) Applicant: QUALCOMM Incorporated, San Diego, CA (US)

(72) Inventors: Amit Gupta, San Diego, CA (US); Andrew Cheung, Escondido, CA (US); Ameya Kulkarni, San Diego, CA (US); Hemant Kumar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,881

(22) Filed: Feb. 21, 2018

(65) Prior Publication Data

US 2018/0181364 A1 Jun. 28, 2018

Related U.S. Application Data

(63) Continuation-in-part of application No. 15/631,088, filed on Jun. 23, 2017.

(Continued)

(51) Int. Cl.
*G06F 13/38* (2006.01)
*G06F 3/16* (2006.01)

(52) U.S. Cl.
CPC .............. *G06F 3/162* (2013.01); *G06F 3/165* (2013.01); *G06F 13/382* (2013.01); *Y02D 10/14* (2018.01); *Y02D 10/151* (2018.01)

(58) Field of Classification Search
CPC combination set(s) only.
See application file for complete search history.

(56) References Cited

U.S. PATENT DOCUMENTS 6,577,337 B1 * 6/2003 Kang ................... G06F 1/1605
348/14.08
7,472,217 B2 12/2008 Lou et al.
(Continued)

FOREIGN PATENT DOCUMENTS

EP 2423806 A1 2/2012
EP 2530599 A1 12/2012

OTHER PUBLICATIONS

International Search Report and Written Opinion for PCT/US2017/039201, dated Sep. 22, 2017, 16 pages.

(Continued)

*Primary Examiner* — Raymond N Phan
(74) *Attorney, Agent, or Firm* — Withrow & Terranova, PLLC

(57) ABSTRACT

Systems and methods for using distributed Universal Serial Bus (USB) host drivers are disclosed. In one aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low-power processor to USB hardware that bypasses the application processor. Bypassing the application processor in this fashion allows the application processor to remain in a sleep mode for longer periods of time instead of processing digital data received from the low-power processor or the USB hardware. Further, by bypassing the application processor, latency is reduced, which improves the user experience.

20 Claims, 25 Drawing Sheets

Related U.S. Application Data

(60) Provisional application No. 62/355,279, filed on Jun. 27, 2016, provisional application No. 62/514,211, filed on Jun. 2, 2017.

(56) References Cited

U.S. PATENT DOCUMENTS

| | | | |
|---|---|---|---|
| 8,429,299 B2 | 4/2013 | Chan | |
| 8,521,934 B1 | 8/2013 | Ni | |
| 8,886,699 B2 | 11/2014 | Hickey et al. | |
| 9,053,246 B2 | 6/2015 | Moore | |
| 9,684,915 B1* | 6/2017 | Cronin | G06Q 30/0611 |
| 2002/0069308 A1 | 6/2002 | Jones et al. | |
| 2003/0107998 A1 | 6/2003 | Mowery et al. | |
| 2004/0161115 A1 | 8/2004 | Loose | |
| 2006/0010264 A1 | 1/2006 | Rader et al. | |
| 2006/0182427 A1* | 8/2006 | Chen | H04N 5/781 |
| | | | 386/231 |
| 2006/0196348 A1* | 9/2006 | Cummings | G10H 3/188 |
| | | | 84/731 |
| 2007/0094525 A1 | 4/2007 | Uguen et al. | |
| 2007/0152076 A1* | 7/2007 | Chiang | F25D 29/00 |
| | | | 236/94 |
| 2007/0168262 A1 | 7/2007 | Morotomi et al. | |
| 2008/0104422 A1 | 5/2008 | Mullis et al. | |
| 2008/0229335 A1* | 9/2008 | Robbin | H04L 12/66 |
| | | | 719/328 |
| 2009/0111524 A1 | 4/2009 | Basaralu | |
| 2010/0188550 A1 | 7/2010 | Ichieda | |
| 2011/0090883 A1 | 4/2011 | Tanaka et al. | |
| 2011/0173351 A1 | 7/2011 | Aull et al. | |
| 2012/0159220 A1 | 6/2012 | Winkler et al. | |
| 2012/0314650 A1 | 12/2012 | Medapalli et al. | |
| 2013/0007324 A1 | 1/2013 | Moore et al. | |
| 2013/0072260 A1 | 3/2013 | Nair et al. | |
| 2013/0179671 A1 | 7/2013 | Tsai et al. | |
| 2013/0223635 A1 | 8/2013 | Singer et al. | |
| 2013/0282951 A1 | 10/2013 | Kuo et al. | |
| 2014/0082142 A1 | 3/2014 | Geffin | |
| 2014/0201399 A1* | 7/2014 | Brabenac | G06F 13/10 |
| | | | 710/63 |
| 2014/0222436 A1 | 8/2014 | Binder et al. | |
| 2015/0264513 A1 | 9/2015 | Ryazanov | |
| 2015/0312475 A1* | 10/2015 | Dinev | H04N 5/23225 |
| | | | 348/222.1 |
| 2015/0346794 A1 | 12/2015 | Sakashita et al. | |
| 2016/0004287 A1 | 1/2016 | Qiu | |
| 2016/0132369 A1 | 5/2016 | Lee et al. | |
| 2016/0132840 A1* | 5/2016 | Bowles | G06Q 30/0278 |
| | | | 705/306 |
| 2016/0378465 A1 | 12/2016 | Venkatesh et al. | |
| 2016/0381191 A1 | 12/2016 | Marque et al. | |
| 2017/0371681 A1 | 12/2017 | Kulkarni et al. | |
| 2017/0373881 A1* | 12/2017 | Yu | H04L 12/40058 |
| 2018/0070840 A1* | 3/2018 | Cronin | A61B 5/02438 |
| 2018/0115130 A1* | 4/2018 | Truluck | G06F 21/85 |
| 2018/0150118 A1* | 5/2018 | Kalam | G06F 1/266 |

OTHER PUBLICATIONS

Second Written Opinion for PCT/US2017039201, dated May 16, 2018, 7 pages.

Author Unknown, "Audio subsystem power management for modern standby platforms," Microsoft Corporation, Retrieved from internet on Apr. 16, 2017, https://msdn.microsoft.com/en-us/windows/hardware/commercialize/...es/audio-subsystem-power-management-for-modern-standby-platforms, 18 pages.

Castor-Perry, Kendall, "Programmable Clock Generation and Synchronization for USB Audio Systems," UK 24th Conference: The Ins & Outs of Audio, Jun. 2011, AES, 10 pages.

Huang-Bing, Gao et al., "The Deisgn of a Network Video Transmission System Based on DSP and USB," 2010 2nd International Asia Conference on Informatics in Control, Automation and Robotics, 2010, IEEE, pp. 121-123.

International Preliminary Report on Patentability for PCT/US2017/039201, dated Sep. 26, 2018, 7 pages.

International Search Report and Written Opinion for PCT/US2019/014511, dated Apr. 5, 2019, 16 pages.

\* cited by examiner

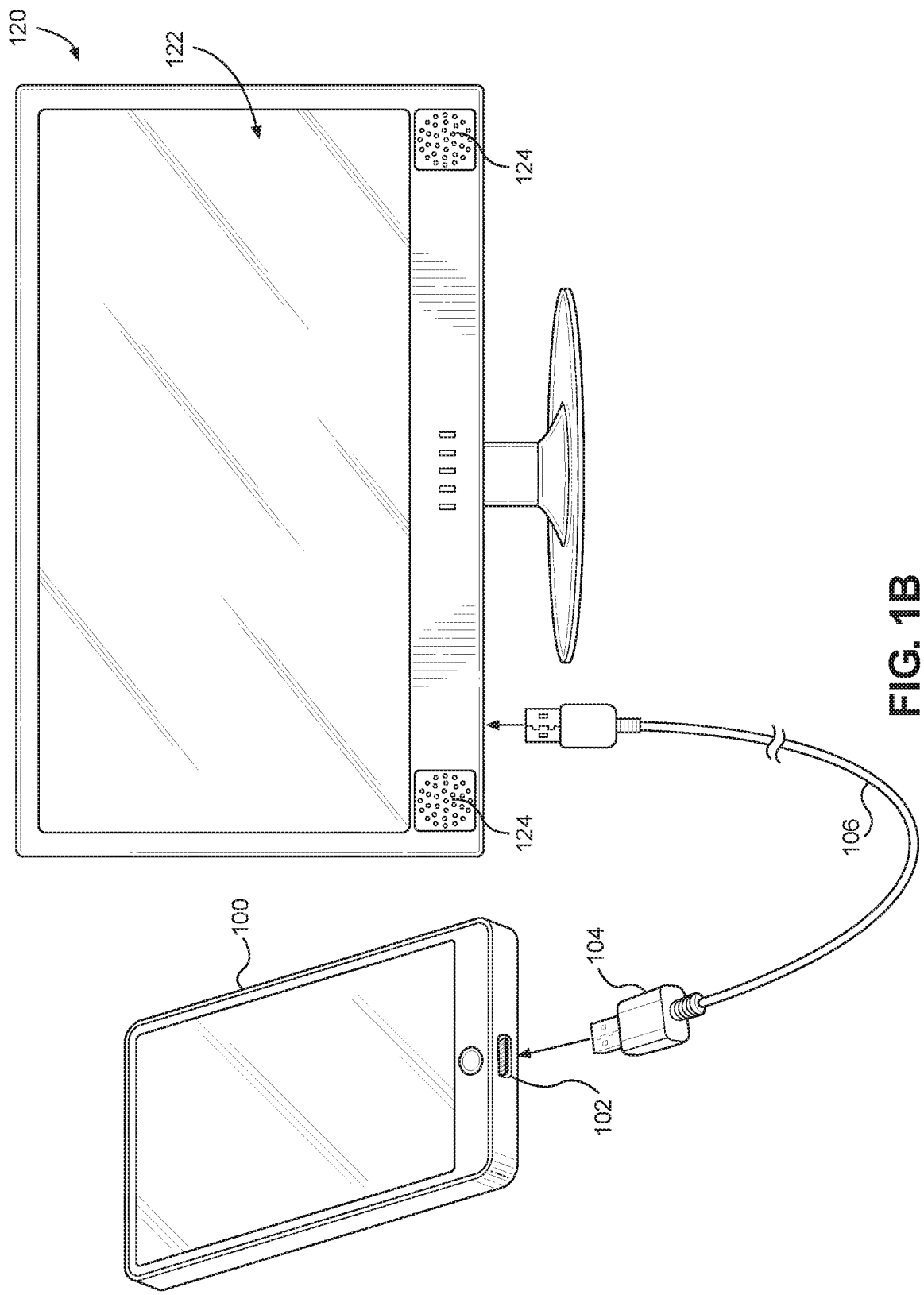

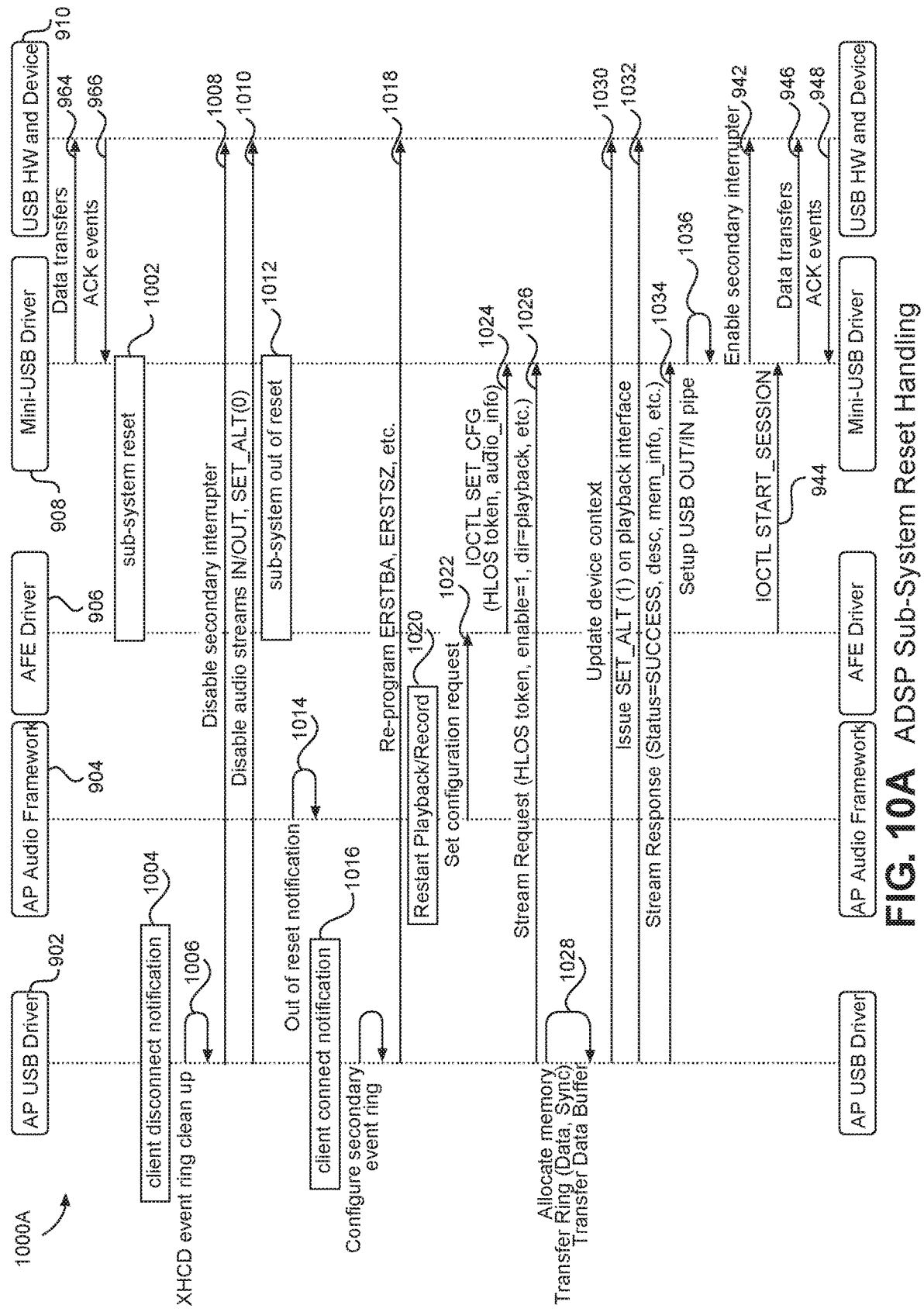
FIG. 10A ADSP Sub-System Reset Handling

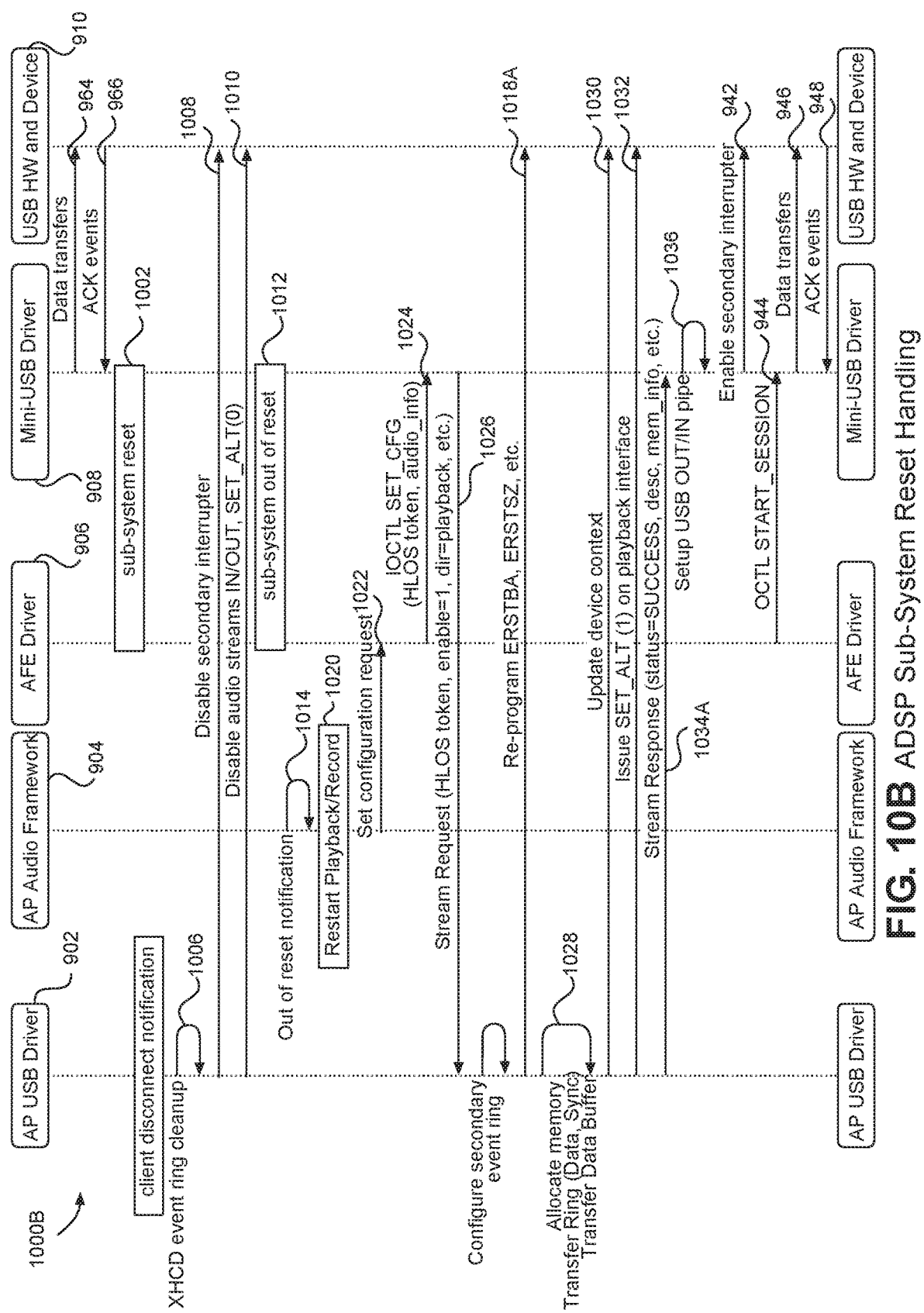
FIG. 10B ADSP Sub-System Reset Handling

CONTROLLING DATA STREAMS IN UNIVERSAL SERIAL BUS (USB) SYSTEMS

PRIORITY CLAIMS

The present application is a continuation-in-part of and claims priority to U.S. patent application Ser. No. 15/631,088, filed on Jun. 23, 2017 and entitled "SYSTEMS AND METHODS FOR USING DISTRIBUTED UNIVERSAL SERIAL BUS (USB) HOST DRIVERS," the contents of which is incorporated herein by reference in its entirety.

The '088 application claims priority to and the benefit of U.S. Provisional Patent Application Ser. No. 62/355,279, filed on Jun. 27, 2016 and entitled "METHODS TO REDUCE POWER CONSUMPTION AND LATENCY FOR UNIVERSAL SERIAL BUS (USB) DIGITAL AUDIO PERIPHERALS BY USING DISTRIBUTED USB HOST DRIVERS," the contents of which is incorporated herein by reference in its entirety.

The '088 application also claims priority to and the benefit of U.S. Provisional Patent Application Ser. No. 62/514,211, filed on Jun. 2, 2017 and entitled "SYSTEMS AND METHODS FOR USING DISTRIBUTED UNIVERSAL SERIAL (USB) HOST DRIVERS," the contents of which is incorporated herein by reference in its entirety.

BACKGROUND

I. Field of the Disclosure

The technology of the disclosure relates generally to managing Universal Serial Bus (USB) peripherals, e.g., USB Digital Headset.

II. Background

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

As mobile communication devices have evolved into multimedia centers, so too have the types of peripherals that are capable of interoperating with mobile communication devices. Remote displays, remote speakers, headsets, headsets with microphones, and the like have all been adapted for use with mobile communication devices. In some instances the peripheral communicates with the mobile communication device wirelessly such as through a BLUETOOTH connection. In other instances, particularly in audio use cases, a wire may be used to connect the mobile communication device to the peripheral. One common connection point for such audio wires is a 3.5 millimeter (mm) audio jack.

Conflicting data in the mobile communication industry indicates variously that consumers prefer smaller or larger displays on mobile communication devices. Responding to the belief that lighter mobile communications are more desirable, there remains a trend to make mobile communication devices thinner. As the devices become thinner, the space required to support a 3.5 mm audio jack becomes a limiting factor. Accordingly, there has been a recent trend to use the new Universal Serial Bus (USB) Type-C connector for any digital peripheral including any audio peripheral. This trend is the result of the fact that the form factor for a Type-C connector has a dimension smaller than 3.5 mm and thus allows further thinning of mobile communication devices. Further, USB Type-C cables support high bandwidth digital delivery, which is generally held to be of higher quality than older analog technology associated with the 3.5 mm audio jack.

While USB Type-C audio peripherals may improve user experience by providing better audio quality, it has been noted that USB in general consumes more power from mobile communication devices than an analog audio jack. Regardless of the size of the mobile communication device, there is a uniform desire to decrease power consumption so as to extend battery life. Accordingly, there is a need to improve power consumption profiles for mobile communication devices when a digital USB peripheral (e.g., digital audio USB headset device with Type-C connector) is connected.

SUMMARY OF THE DISCLOSURE

Aspects disclosed in the detailed description include systems and methods for using distributed Universal Serial Bus (USB) host drivers. In an exemplary aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low-power processor to USB hardware that bypasses the application processor. Bypassing the application processor in this fashion allows the application processor to remain in a sleep mode for longer periods of time instead of processing digital data received from the low-power processor or the USB hardware. Further, by bypassing the application processor, latency is reduced, which improves the user experience. While USB is particularly contemplated, the wired connection between the USB hardware and the peripheral may be a proprietary element that is capable of carrying USB signals. Further aspects of the present disclosure allow a legacy USB driver to interoperate with the distributed USB driver and ensure that certain functions like clean-up are handled.

In this regard in one aspect, a method of controlling data streams in a USB system is disclosed. The method includes establishing a connection between an application processor and an external digital USB peripheral. The method also includes allowing a processor to pass data packets to USB hardware through a system bus. The method also includes passing the data packets from the USB hardware to the external digital USB peripheral.

In another aspect, a method of controlling a USB endpoint is disclosed. The method includes enumerating a USB endpoint with a USB driver on an application processor. The method also includes receiving a request from a second USB driver on a second processor to enable or disable a data stream. The method also includes, responsive to the request, enabling or disabling a selected interface using control endpoints and the USB driver on the application processor. The method also includes providing from the USB driver on the application processor to the second USB driver on the second processor a device descriptor. The method also includes, at the second USB driver, using the device descriptor passed from the USB driver to perform data transfers.

BRIEF DESCRIPTION OF THE FIGURES

FIG. 1B is a simplified perspective view of a mobile communication device coupled to a display peripheral in which exemplary aspects of the present disclosure may operate to reduce power consumption and latency;

FIGS. 10A and 10B represent signal flow diagrams for a sub-system reset of a low-power processor;

DETAILED DESCRIPTION

Figure 1A:
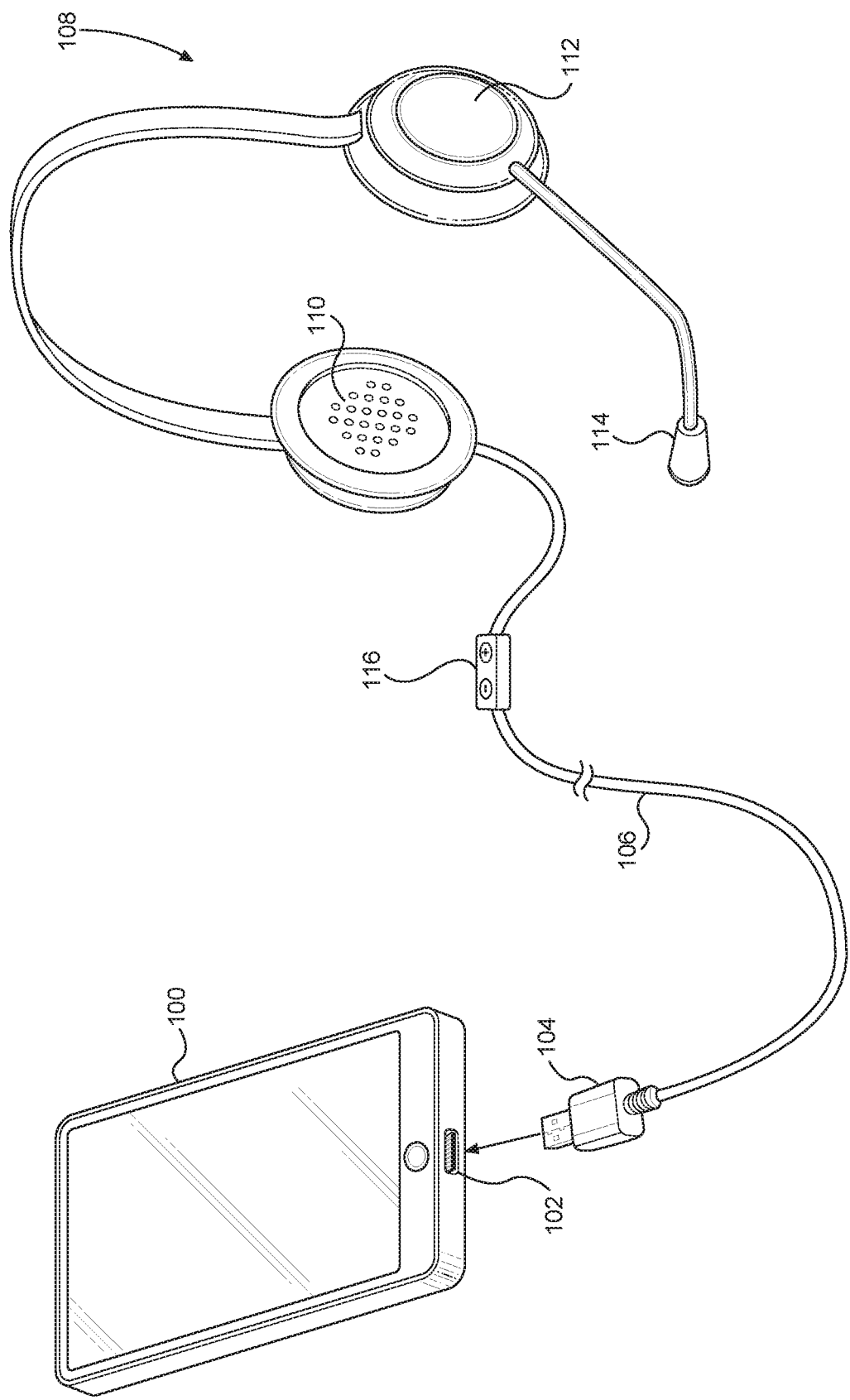
FIG. 1A is a simplified perspective view of a mobile communication device coupled to an audio peripheral in which exemplary aspects of the present disclosure may operate to reduce power consumption and latency.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for using distributed Universal Serial Bus (USB) host drivers. In an exemplary aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low-power processor to USB hardware that bypasses the application processor. Bypassing the application processor in this fashion allows the application processor to remain in a sleep mode for longer periods of time instead of processing digital data received from the low-power processor or the USB hardware. Further, by bypassing the application processor, latency is reduced, which improves the user experience. While USB is particularly contemplated, the wired connection between the USB hardware and the peripheral may be a proprietary element that is capable of carrying USB signals. Further aspects of the present disclosure allow a legacy USB driver to interoperate with the distributed USB driver and ensure that certain functions like clean-up are handled.

Before addressing exemplary aspects of the present disclosure, an additional overview of relevant design criteria is provided. When shifting a USB host driver to a distributed model where a portion of the USB host driver operates on a second processor, relevant criteria for selecting the second processor includes whether the second processor is capable of communicating with USB hardware and whether the second processor consumes less power than the application processor. In general, the present disclosure contemplates use in an audio, video, or multimedia environment, but the present disclosure is not limited to just those situations, and other digital USB environments may benefit from aspects of the present disclosure. In the interests of simplicity, an audio environment will be used initially to illustrate exemplary aspects of the present disclosure with the understanding that the teachings may be applied to video, multimedia or other digital USB environments. Turning to the audio environment, it should be appreciated that there are at least two types of processing done on audio packets. A first type of processing is audio processing at an audio driver. Audio processing is where packets are encoded, decoded, and signals are processed. A second type of processing is USB audio packet processing, which is typically done at a USB driver. USB audio packet processing is where packets are prepared, packaged, and queued on to the USB hardware. As used herein, when the present disclosure refers to audio processing, such reference is to USB audio packet processing (i.e., the second type of processing). It should further be appreciated that while the discussion below focuses on a Type-C USB connection, the present disclosure is not so limited. The present disclosure is applicable to any connector which uses a digital audio USB protocol such as, but not limited to, the following receptacles: Type-A, micro-A, and proprietary versions of same such as LIGHTNING™; and the following connectors: Type-B, micro-B, and proprietary versions of the same such as LIGHTNING™, and cables that are used to connect such USB receptacles/connectors to an external digital USB device. Thus, a proprietary cable with proprietary connectors inserted into a proprietary receptacle that carries digital USB signals may still benefit from exemplary aspects of the present disclosure.

In this regard, FIG. 1A is a simplified perspective view of a mobile communication device 100 with a Type-C USB receptacle 102 configured to couple to a Type-C USB connector 104 on a USB cable 106. As noted above, the present disclosure is not limited to Type-C receptacles, connectors, and cables, but such are used to illustrate exemplary aspects of the present disclosure. At a distal end of the USB cable 106 is a digital audio headset 108 having plural speakers 110 in headphones 112 and a microphone 114. Digital audio signals may pass between the mobile communication device 100 and the digital audio headset 108 through the USB cable 106. The USB cable 106 may further include an audio control unit 116 which may allow for volume control through +/− buttons and/or play/pause/stop, mute, unmute functionality through additional input buttons (not illustrated). Again, while a digital audio headset 108 is illustrated, the present disclosure may also benefit other external digital USB devices.

FIG. 1B illustrates an alternate multimedia situation. In FIG. 1B, the mobile communication device 100 is coupled to a display device 120, which may include a visual display screen 122 and speakers 124. Digital multimedia signals may pass between the mobile communication device 100 and the display device 120 through the USB cable 106.

Figure 1D:
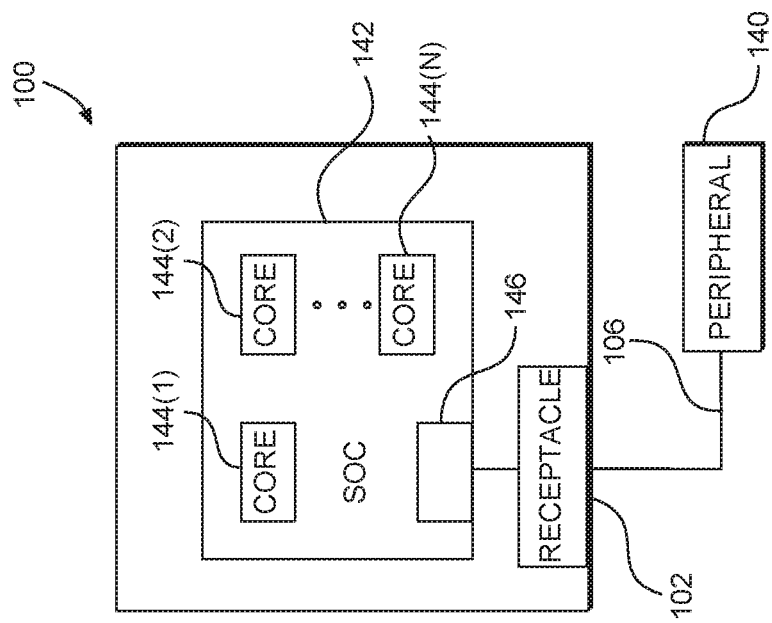
FIG. 1D is a simplified block diagram of a mobile communication device coupled to a peripheral in which exemplary aspects of the present disclosure may operate to reduce power consumption and latency.
Figure 1C:
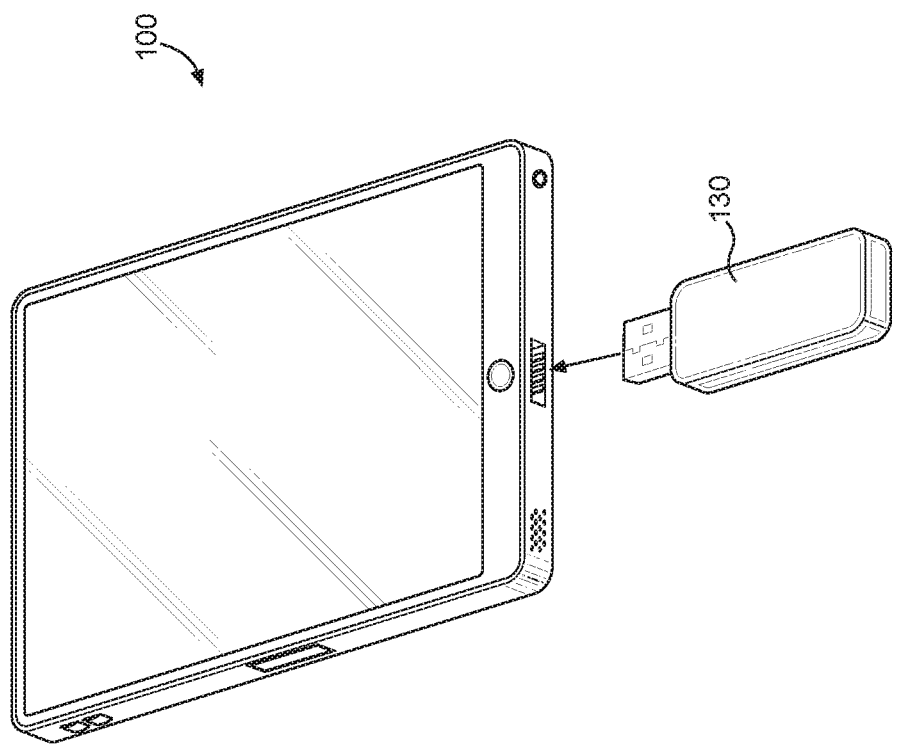
FIG. 1C is a simplified perspective view of a mobile communication device coupled to a memory peripheral in which exemplary aspects of the present disclosure may operate to reduce power consumption and latency.

FIG. 1C illustrates an alternate digital data situation. In FIG. 1C, the mobile communication device 100 is coupled to a memory device 130 such as a flash drive. In such instance, the memory device 130 may have a USB plug (not shown) that plugs into the Type-C USB receptacle 102 (not shown in FIG. 1C).

FIG. 1D provides a more generic representation where the mobile communication device 100 is coupled to a generic external digital USB peripheral 140 by the USB cable 106. Inside the mobile communication device 100, an integrated circuit (IC) 142, which may be a multi-core system on a chip (SoC), may include multiple processing cores 144(1)-144(N). The multiple processing cores 144(1)-144(N) may be optimized to perform different functions such as functions of an application processor, a DSP, an audio DSP (ADSP), a memory controller, a power controller, or the like. The IC 142 may further include USB hardware 146. Software drivers that control the USB hardware 146 may operate within one or more of the multiple processing cores 144(1)-144(N) as described in greater detail below.

Figure 2:
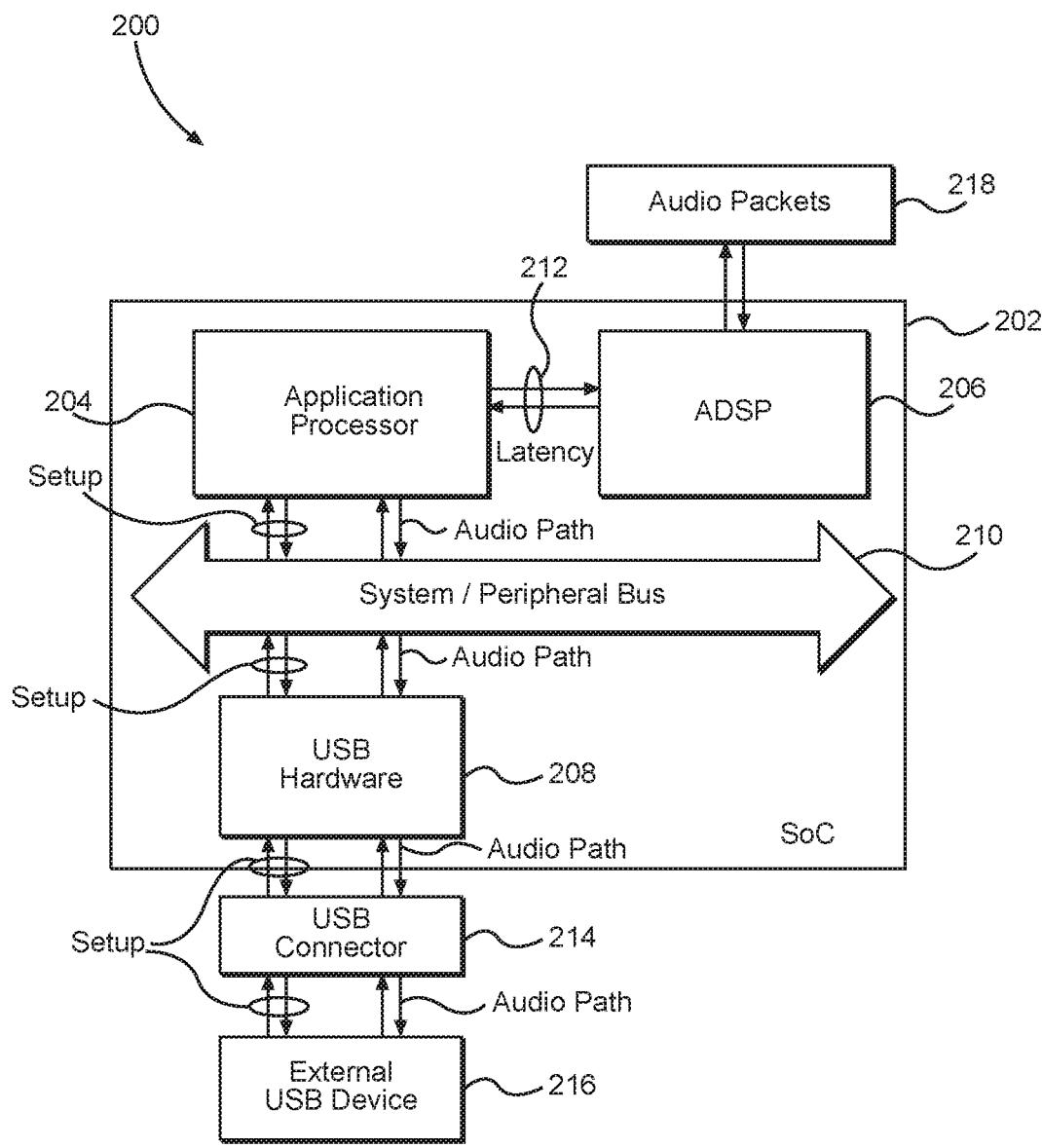
FIG. 2 is a simplified block diagram of an exemplary conventional Universal Serial Bus (USB) communication path for a mobile communication device and an external peripheral.

In conventional systems, digital data for a headset, display, or other peripheral is processed by an application processor before being passed to USB hardware. Such application processor consumes relatively large amounts of power and thus drains a battery of such a device quickly. This situation is illustrated in FIG. 2. Specifically, FIG. 2 illustrates a mobile communication device 200 having an SoC 202 that may include an application processor 204 and an ADSP 206. The application processor 204 is coupled to USB hardware 208 through a system or peripheral bus 210. The application processor 204 further communicates with the ADSP 206 through traces 212 or other conductive element. The USB hardware 208 is coupled to a USB connector 214, which may be a USB receptacle into which an external USB device 216, such as a headset, display, or the like is coupled, such as through a cable. In use, audio packets 218 pass to the ADSP 206. The ADSP 206 passes the audio packets 218 to the application processor 204 through the traces 212, where they are processed and passed to the USB hardware 208 through the system bus 210. In the opposite direction, and not specifically illustrated, audio data may originate at a microphone or other recording source and pass into the external USB device 216. From the external USB device 216, such audio data may pass through the USB connector 214, through the USB hardware 208, and then to the application processor 204, and finally to the ADSP 206. For the playback situation, communication across the traces 212 adds latency to the time required for the audio packets 218 to reach the USB hardware 208. In some instances, this latency may be detected by the listener and is generally undesirable. Further, the application processor 204, which as noted above, consumes relatively large amounts of power, cannot be put into a low-power mode while processing the audio packets 218. Accordingly, the mobile communication device 200 depletes a battery power source and may otherwise suffer from poor audio performance.

Figure 3:
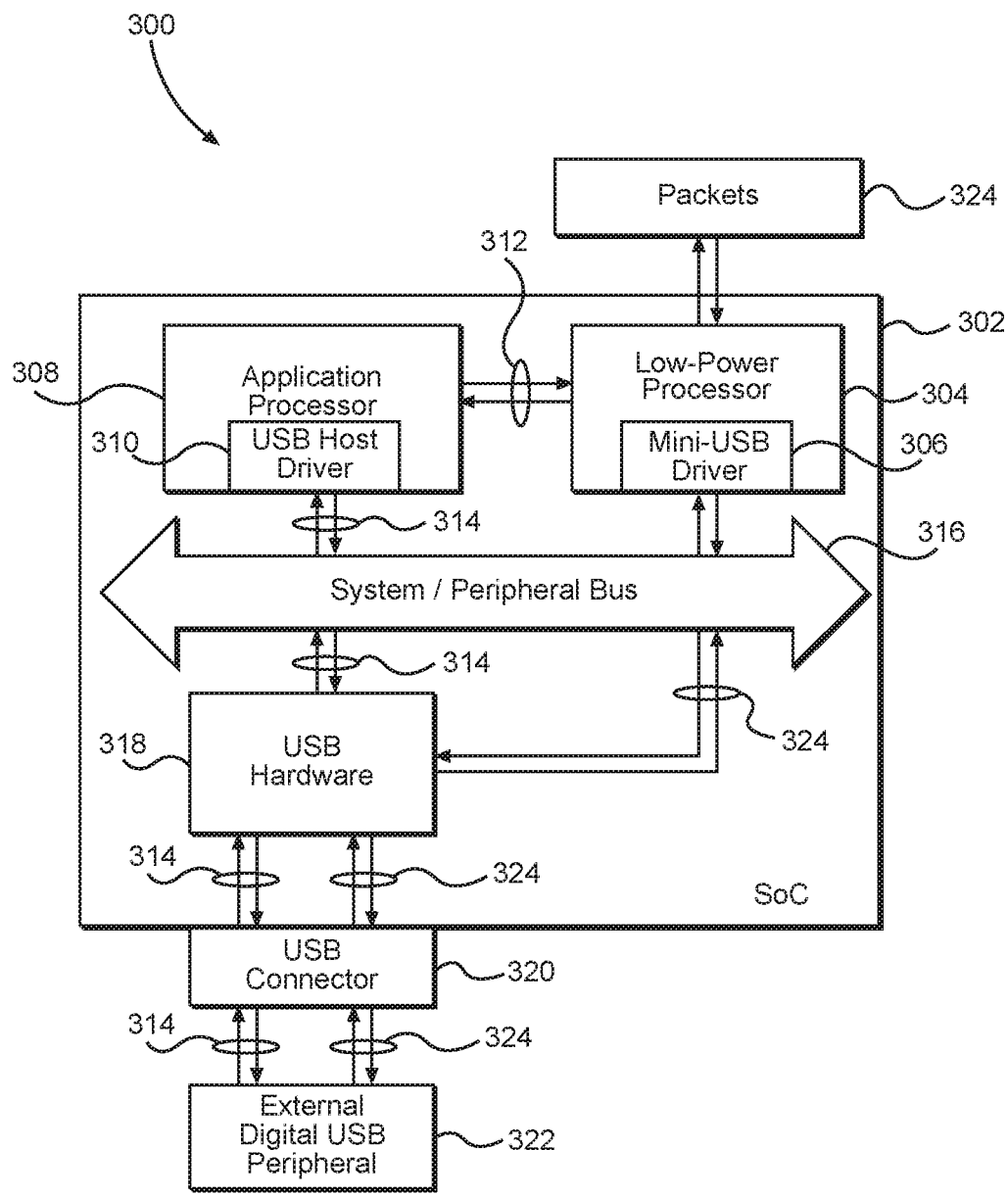
FIG. 3 is simplified block diagram of a USB communication path according to an exemplary aspect of the present disclosure during set-up.
Figure 4:
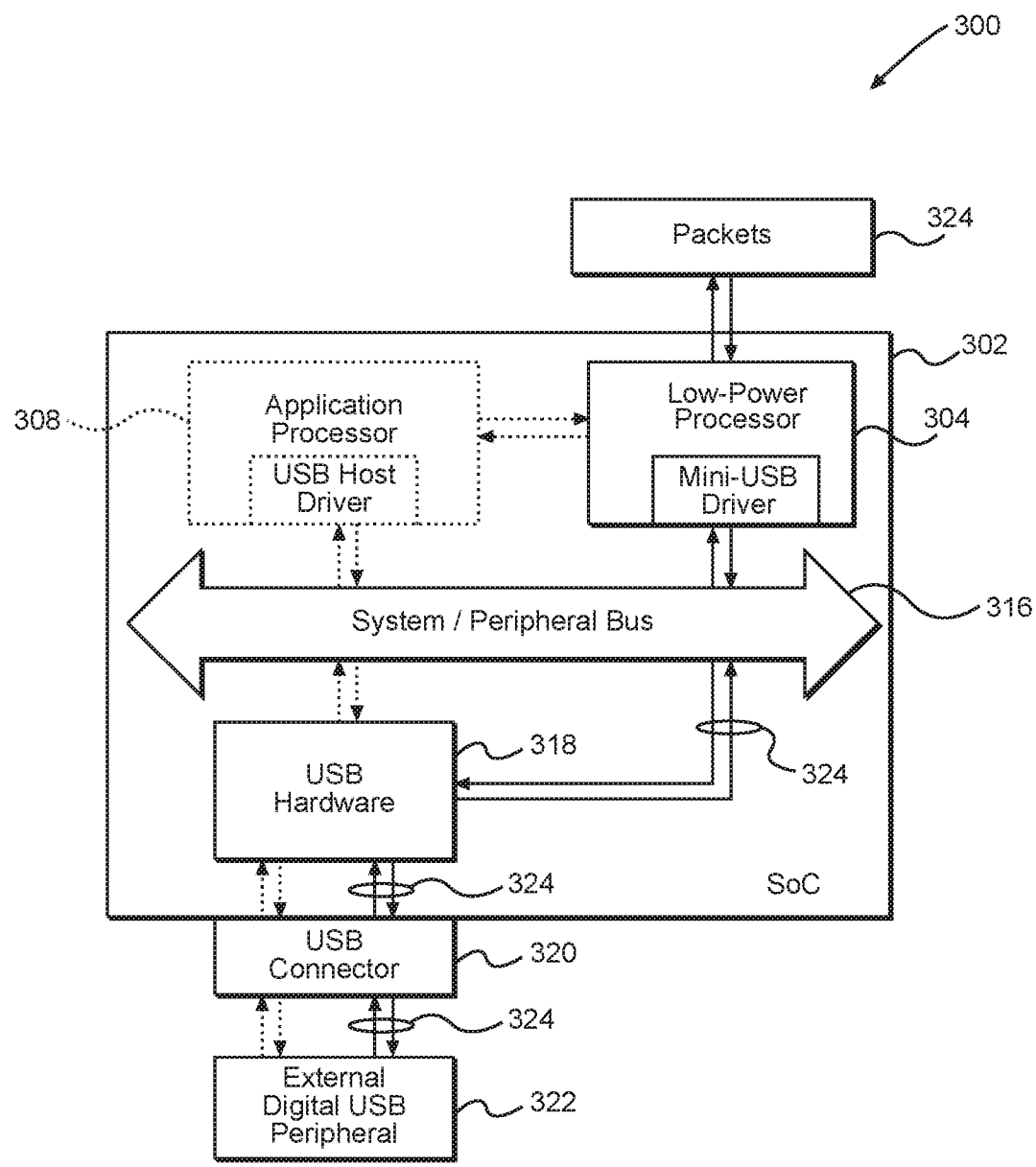
FIG. 4 is the USB communication path of FIG. 3 after set-up is complete.

In contrast to the power consumption and slow activity in the mobile communication device 200, exemplary aspects of the present disclosure move processing of packets, and more specifically multimedia packets, and more specifically audio packets, into a low-power processor such as the ADSP and set up a communication path from the low-power processor to the USB hardware, effectively bypassing the application processor, which in turn allows the application processor to be placed in a low-power mode. In this regard, FIGS. 3 and 4 illustrate a mobile communication device 300 with an SoC 302. The SoC 302 includes a low-power processor 304 such as an ADSP. The low-power processor 304 includes a mini-USB driver 306 therein. The SoC 302 further includes an application processor 308 with a USB host driver 310 therein. Note that the mini-USB driver 306 may also be referred to herein as a second driver to differentiate the mini-USB driver 306 from the USB host driver 310. The low-power processor 304 and the application processor 308 may communicate over traces 312 so as to allow interprocessor communication. The application processor 308 may communicate non-multimedia or non-audio data packets 314 to a system bus 316 which in turn passes the non-multimedia or non-audio data packets 314 to USB hardware 318. The USB hardware 318 may pass the non-multimedia or non-audio data packets 314 to a USB connector 320 and then to a remote external digital USB peripheral 322. Audio packets 324 are received at the low-power processor 304 and passed to the USB hardware 318 through the system bus 316. In an exemplary aspect, the application processor 308 sets up the communication path for the mini-USB driver 306 and then may enter a low-power mode as generally illustrated by the dotted elements in FIG. 4 as the low-power processor 304 and the mini-USB driver 306 pass the audio packets 324 back and forth to the remote external digital USB peripheral 322.

It should be appreciated that adding the mini-USB driver 306 includes allowing the mini-USB driver 306 to process an entirety of a protocol stack. For example, an entirety of an Open Systems Interconnection (OSI) stack is processed by the mini-USB driver 306 and the USB host driver 310 and not splitting, for example, layers 1-4 of the stack at a driver on one of the processors versus layers 5-7 at another driver on another processor.

Figure 5:
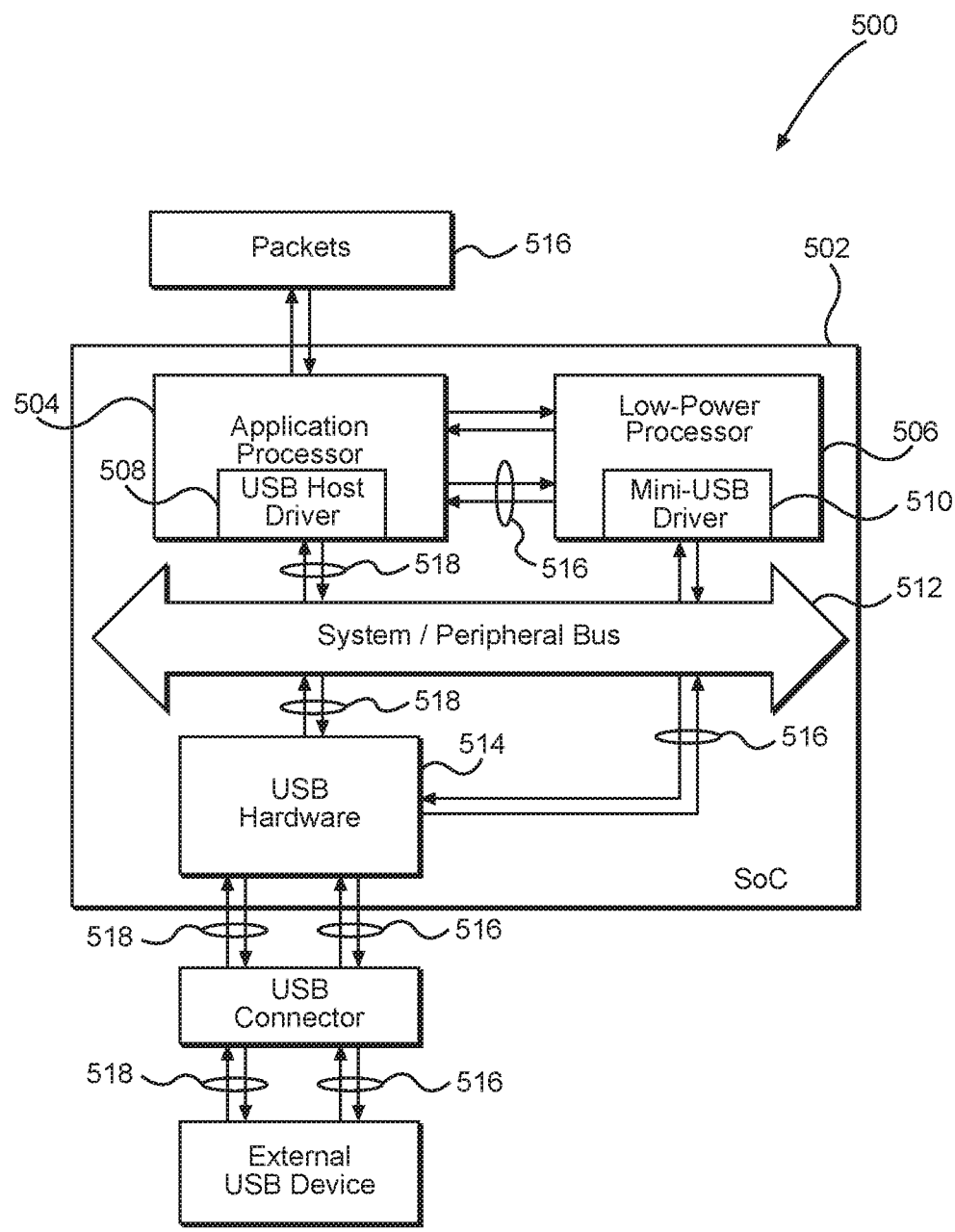
FIG. 5 is an alternate USB communication path where an application processor still is active in the USB communication path for certain functions.

While the arrangement of the mobile communication device 300 provides maximal opportunities to save power and reduce latency, other arrangements are possible and may still provide power saving opportunities. For example, as illustrated in FIG. 5, a mobile communication device 500 may include an SoC 502 that includes an application processor 504 and a low-power processor 506. The application processor 504 may include a USB host driver 508 and the low-power processor 506 may include a mini-USB driver 510. Both the application processor 504 and the low-power processor 506 are coupled to a system bus 512. Likewise, USB hardware 514 is coupled to the system bus 512. Audio packets 516 are passed to the application processor 504 which performs encoding and decoding, and then passes the audio packets 516 to the low-power processor 506. The low-power processor 506 passes the audio packets 516 to the USB hardware 514 through the system bus 512. The application processor 504 sends non-audio packets 518 to the USB hardware 514 through the system bus 512. While the arrangement of the mobile communication device 500 adds latency as the audio packets 516 pass from the application processor 504 to the low-power processor 506, the application processor 504 may intermittently enter a sleep state after filling up buffers (not shown) within the low-power processor 506.

Figure 6:
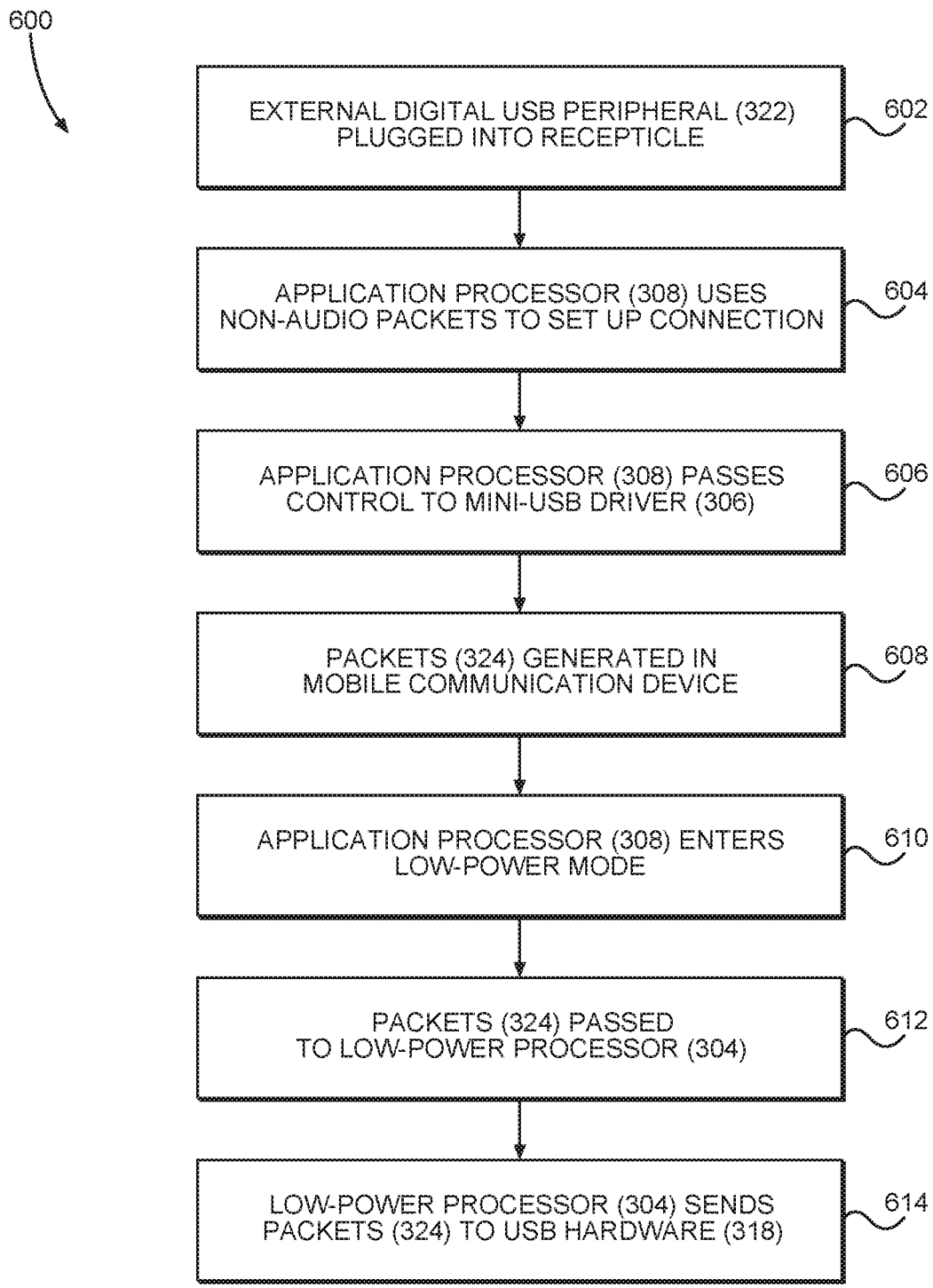
FIG. 6 is a flowchart of an exemplary process for setting up a USB communication path according to the present disclosure.

A flowchart of a simplified process 600 according to an exemplary aspect of the present disclosure is provided with reference to FIG. 6. The process 600 begins when an external digital USB peripheral 322 (such as a digital headset) is plugged into a receptacle on a mobile communication device (block 602). The application processor 308 uses non-audio packets to set up a connection (block 604) between the low-power processor 304 and the USB hardware 318 and a corresponding endpoint in the external digital USB peripheral 322. The application processor 308 then passes control over the connection to the mini-USB driver 306 (block 606). Audio packets 324 are generated in the mobile communication device (block 608). These audio packets 324 may be from an audio file stored on the mobile communication device, streamed from a remote server, stored on a remote memory device, or the like. The application processor 308 may enter a low-power mode (block 610). The audio packets 324 are passed to the low-power processor 304 (block 612) from the audio source (e.g., the audio file in memory). The low-power processor 304 then sends the audio packets 324 to the USB hardware 318 (block 614) without sending the audio packets 324 through the application processor 308.

Early efforts assumed a large degree of latitude in how responsibilities were divided between the USB host driver 310 and the mini-USB driver 306. For example, clean-up functions might be performed by the USB host driver 310. However, there are instances of USB host drivers which may comply with the USB specification, but do not know how to handle bifurcated responsibilities. Accordingly, further exemplary aspects of the present disclosure contemplate adding a further software module that interfaces between the core USB host driver and the mini-USB driver.

Figure 7:
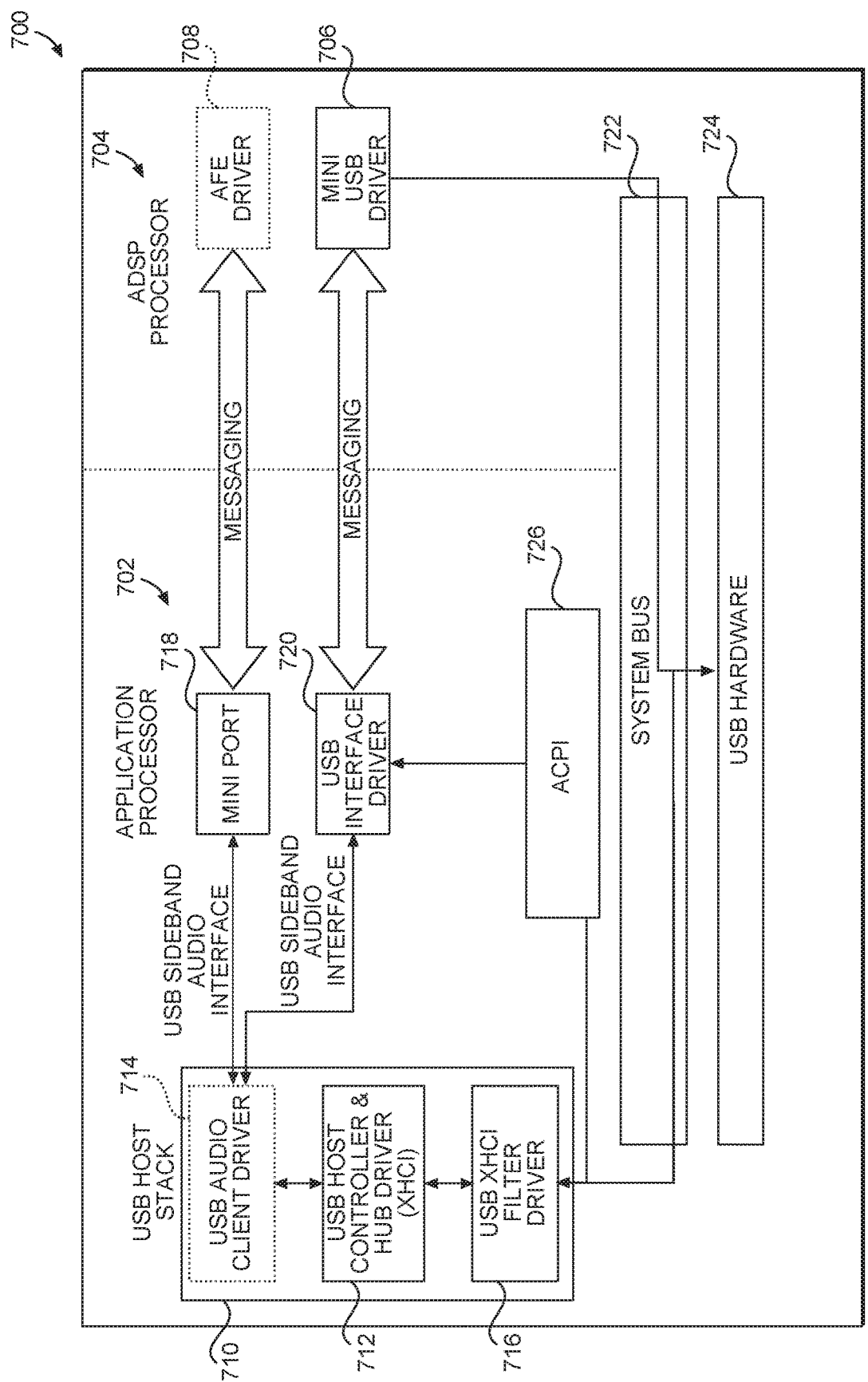
FIG. 7 is a simplified block diagram of software elements within a first processor core interoperating with a legacy USB driver to facilitate distributed USB drivers according to an exemplary aspect of the present disclosure.

FIG. 7 provides a simplified block diagram of the additional software interfacing between the two USB drivers. In this regard, FIG. 7 illustrates a computing device 700 with a first processor 702, which may be an application processor or other high-power processor, and a second processor 704, which may be an ADSP or other low-power processor. It should be appreciated that the first processor 702 and the second processor 704 may be in a single IC or may be in separate ICs as needed or desired. The second processor 704 includes a mini-USB driver 706, comparable to the mini-USB driver 306 of FIG. 3. The second processor 704 may also have, if it is an ADSP, an audio front end (AFE) driver 708.

With continued reference to FIG. 7, the first processor 702 may include a USB host stack 710, which includes a USB host controller and hub driver 712, which may sometimes be referred to as an extensible host control interface (xHCI). In instances where audio packets are being handled, the USB host stack 710 may further include a USB audio client driver 714. Exemplary aspects of the present disclosure add a USB xHCI filter driver 716 to the USB host stack 710 as well as a mini port 718 and a USB interface driver 720. In the case where audio data is being managed, the mini port 718 may be an audio port, and the USB interface driver 720 may be an audio driver. The mini port 718 and USB interface driver 720 may communicate with the USB audio client driver 714 using a USB sideband audio interface. Further, the mini port 718 and the USB interface driver 720 may communicate with the AFE driver 708 and the mini-USB driver 706, respectively. The computing device 700 further includes a system bus 722 and USB hardware 724. The first processor 702 may further include an advanced configuration and power interface (ACPI) module 726. More information about the ACPI module 726 may be found at www.acpi.info. The ACPI module 726 loads a generic interface component driver on an operating system. By adding the drivers 718 and 720 and the module 726, the USB host stack 710 may communicate with the mini-USB driver 706 and handle instructing the mini-USB driver 706, which the generic USB host stack 710 is not readily able to do. Likewise, the drivers 718 and 720 can intercept messages from the mini-USB driver 706 and respond even though the generic USB host stack 710 is otherwise not able to respond. In particular, the drivers 718 and 720 may manage memory allocations of USB structures on behalf of the second processor 704 and help the second processor 704 perform any sub-system restart as an error recovery mechanism.

By bifurcating USB drivers according to the aspects of FIG. 7, the USB host controller and hub driver 712 may manage the control endpoint and basic enumeration. The USB host controller and hub driver 712 may set up the secondary interrupts and allocate memory for secondary interrupter resources like an event ring or transfer ring. The USB host controller and hub driver 712 may further offload the audio endpoints to a different processor (e.g., the second processor 704). In contrast, the mini-USB driver 706 may perform the data transfer for offloaded endpoints (e.g., for an audio system—playback and capture). The mini-USB driver 706 may also manage the secondary event ring and transfer ring. The mini-USB driver 706 may also perform clean-up functions before releasing the interface during a last stop session of the external device. The mini-USB driver 706 may invoke a procedure during disconnection of an external device, where the procedure mirrors a procedure that would be invoked as a last session. The mini-USB driver 706 may further operate during a sub-system restart of the ADSP or other low-power processor, to cause the low-power processor to initiate a stop session for all open endpoints and ensure that the clean-up functions are performed gracefully.

Note further, that exemplary aspects of the present disclosure may be used for multiple USB ports associated with a single USB controller or for computing platforms with more than one USB controller.

Figure 8:
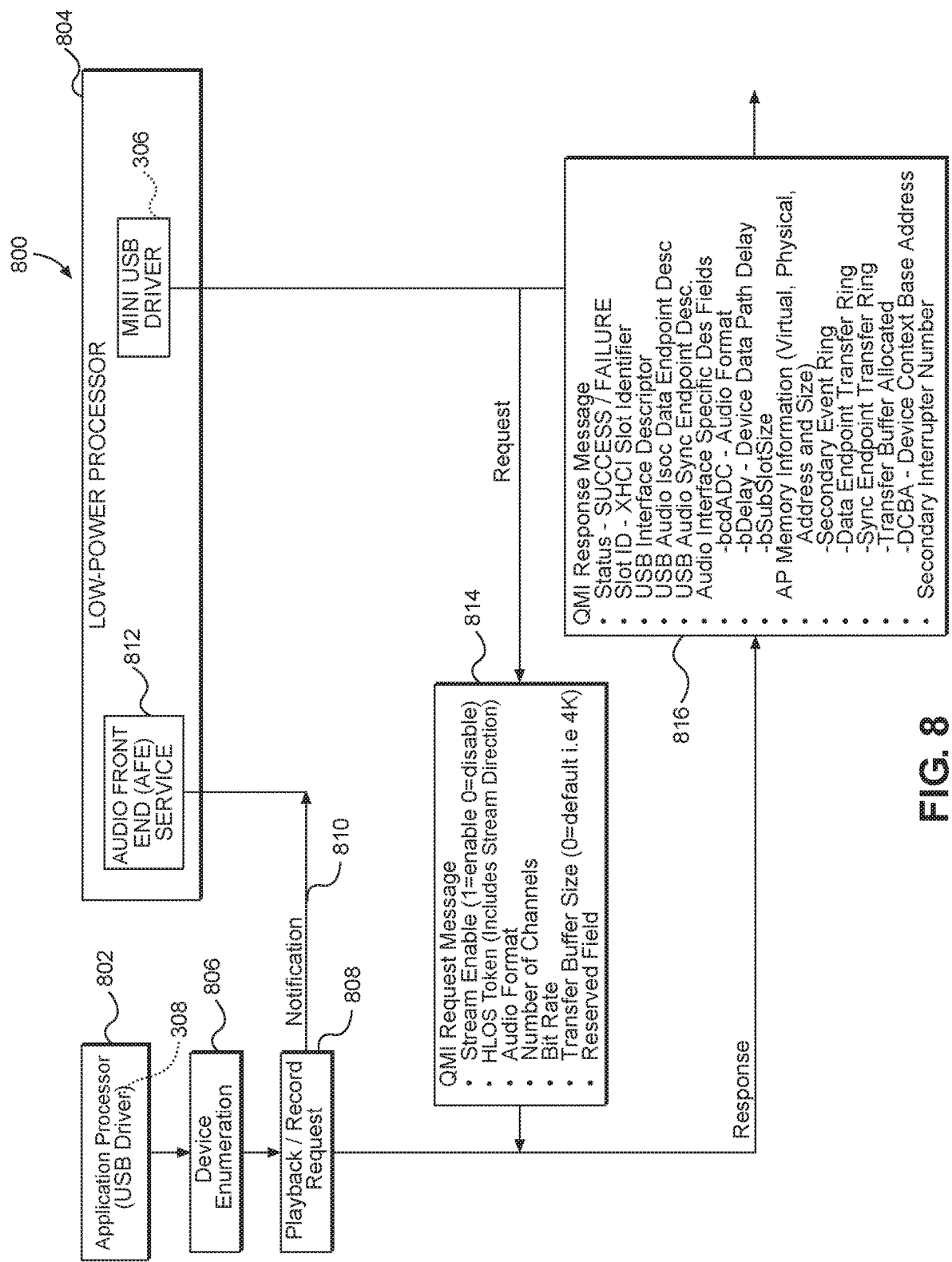
FIG. 8 is a high-level signal flow diagram for USB communication path set-up between an application processor and an audio digital signal processor (DSP) (ADSP)

FIG. 8 illustrates a high-level version of a signal flow 800 between an application processor 802 (e.g., which may be the application processor 308 having the USB host driver 310 of FIG. 3) and a low-power processor 804 (e.g., which may be an ADSP or the low-power processor 304 having the mini-USB driver 306 of FIG. 3). In particular, the USB hardware (e.g., the USB hardware 318) detects insertion and reports insertion to the application processor 802. The application processor 802, using its USB driver, performs device enumeration (block 806). The application processor 802 receives a playback or record request from the external peripheral (block 808). The playback or record request triggers a notification 810 to an AFE service 812 on the low-power processor 804, and may include a variety of information such as the high-level operating system (HLOS) operating token, a sampling rate, a bit width, a number of channels, a number of samples per interval, a sample size in bytes, direction (playback or record), data format, and justification. In response to receipt of this information, the mini-USB driver 306 in the low-power processor 804 sends a request to the USB driver on the application processor 802. This request may include a stream enable command, the HLOS operating token, the audio format, the number of channels, bit rate, transfer buffer size, and a reserved field (block 814). The application processor 802 responds with additional information (block 816) including a status, a slot identifier, a USB interface descriptor, a USB audio isochronous data endpoint description, specific audio interface fields including audio format, device data path delay and slot size, any application processor specific memory information such as an address (virtual, physical, and/or size), a transfer buffer allocated, a device context base address, a secondary interrupter number, a USB core identifier, and a port number. The USB (controller) core identifier is a unique number that identifies a USB core physically (e.g., a base address of the USB controller). The USB controller identifier is used when multiple instances of USB controllers are present in an SoC. Each USB controller may be connected to multiple physical ports which are uniquely identified by port number.

Figure 9A:
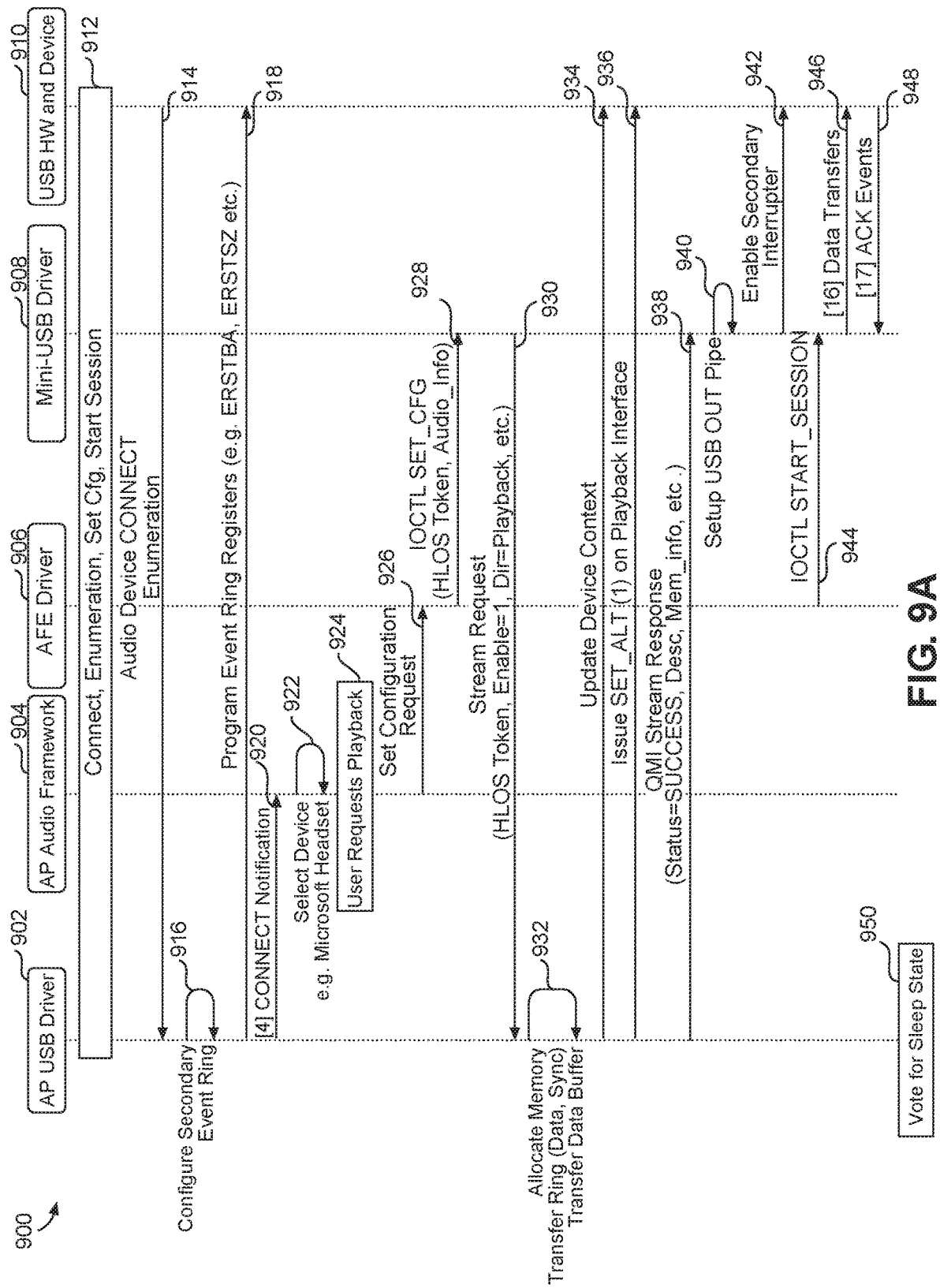
FIGS. 9A-9F represent more specific signal flow diagrams for the USB communication path set-up, stop, and disconnect of FIG. 8.

Likewise, FIGS. 9A-9F illustrate more detailed versions of the signal flows between the various elements according to exemplary aspects of the present disclosure. In this regard, FIG. 9A illustrates a session 900 beginning with interrupts enabled. In particular, FIG. 9A illustrates an application processor USB driver 902, working with an application processor audio framework 904, an AFE driver 906, a mini-USB driver 908, and USB hardware 910. The signaling begins with connection, enumeration, configuration, and session start (block 912). The USB hardware 910 detects an audio device connection and begins enumeration (signal 914). The USB driver 902 configures a secondary event ring (signal 916) and programs event ring registers in the USB hardware 910 (signal 918). The USB driver 902 sends a connection notification to the audio framework 904 (signal 920), which provides a select device popup (signal 922) such as "select MICROSOFT headset" to the user. The audio framework 904 receives a user request for playback (signal 924) and sends a set configuration request (signal 926) to the AFE driver 906. The AFE driver 906 sends a signal 928 to the mini-USB driver 908. The signal 928 may include a token and other audio information. The mini-USB driver 908 sends a stream request to the USB driver 902 (signal 930). The USB driver 902 allocates memory, initiates the transfer ring, and creates the transfer data buffer (signal 932). The USB driver 902 then sends a command to update the device context to the USB hardware 910 (signal 934) as well as issue a SET_ALT command on the Playback Interface (signal 936). The USB driver 902 sends a stream response with status information to the mini-USB driver 908 (signal 938). The mini-USB driver 908 sets up the USB pipe (signal 940) and enables the secondary interrupter (signal 942) at the USB hardware 910. The AFE driver 906 starts the session with signal 944 to the mini-USB driver 908. The process continues with data transfers (signals 946) and ACK events (signals 948) until a vote for a sleep state 950 occurs.

Figure 9B:
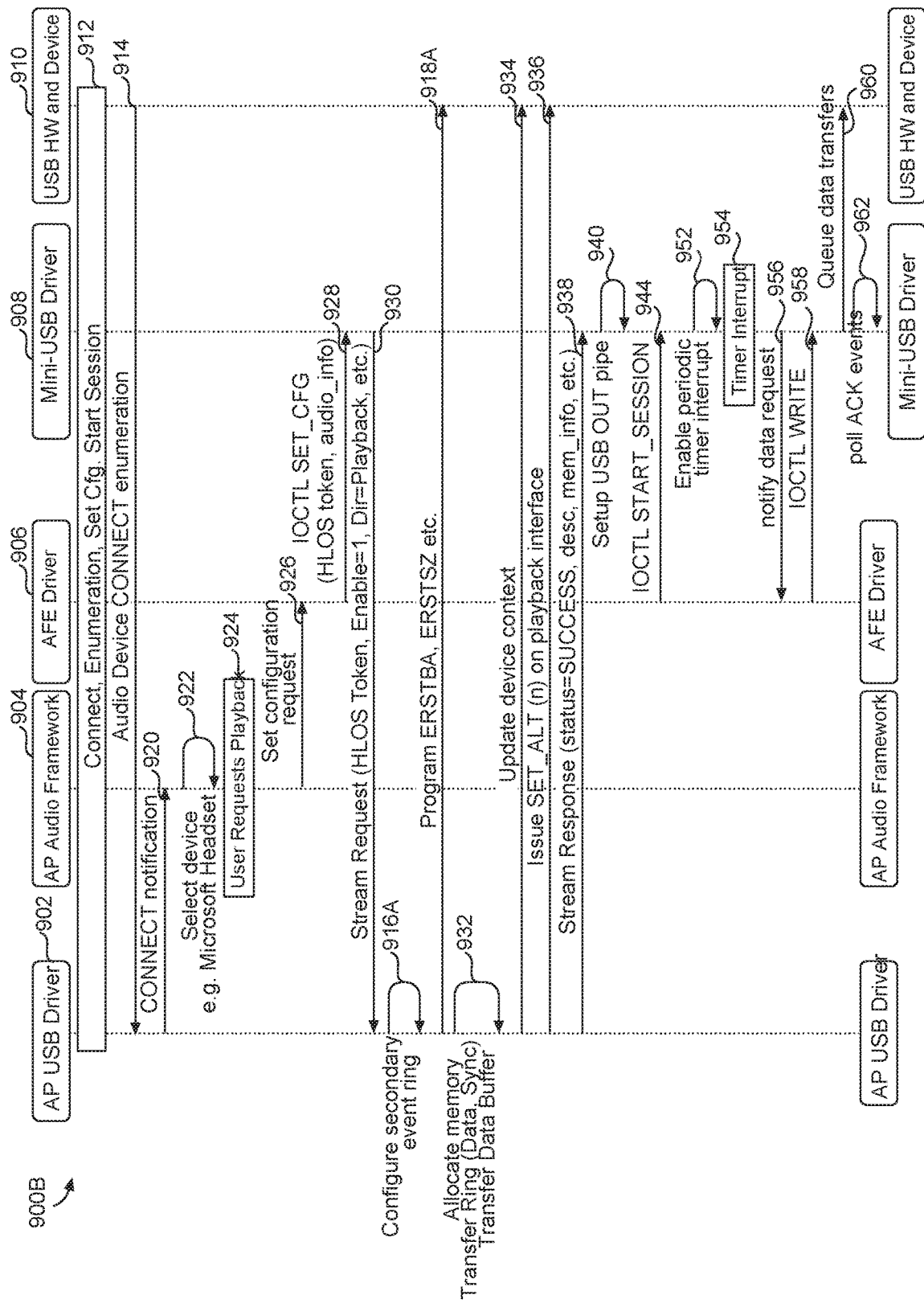

FIG. 9B illustrates a session 900B beginning with polling in place of interrupting. In most regards, the session 900B is similar to the session 900 of FIG. 9A. The configuration of the secondary event ring (signal 916A) and the programming of the event registers (signal 918A) are moved after the stream request signal 930. Further the enabling of the secondary interrupter (signal 942) is omitted. In place of the secondary interrupter, the session 900B uses polling. To allow for polling, the mini-USB driver 908 enables a periodic timer interrupt (signal 952). When a timer interrupt (block 954) occurs in response to the timer, the mini-USB driver 908 sends a notify data request (signal 956) to the AFE driver 906 and receives a write signal 958 therefrom. The mini-USB driver 908 looks at the queue data transfers at the USB hardware 910 (signal 960) and polls the ACK events (signal 962).

Figure 9C:
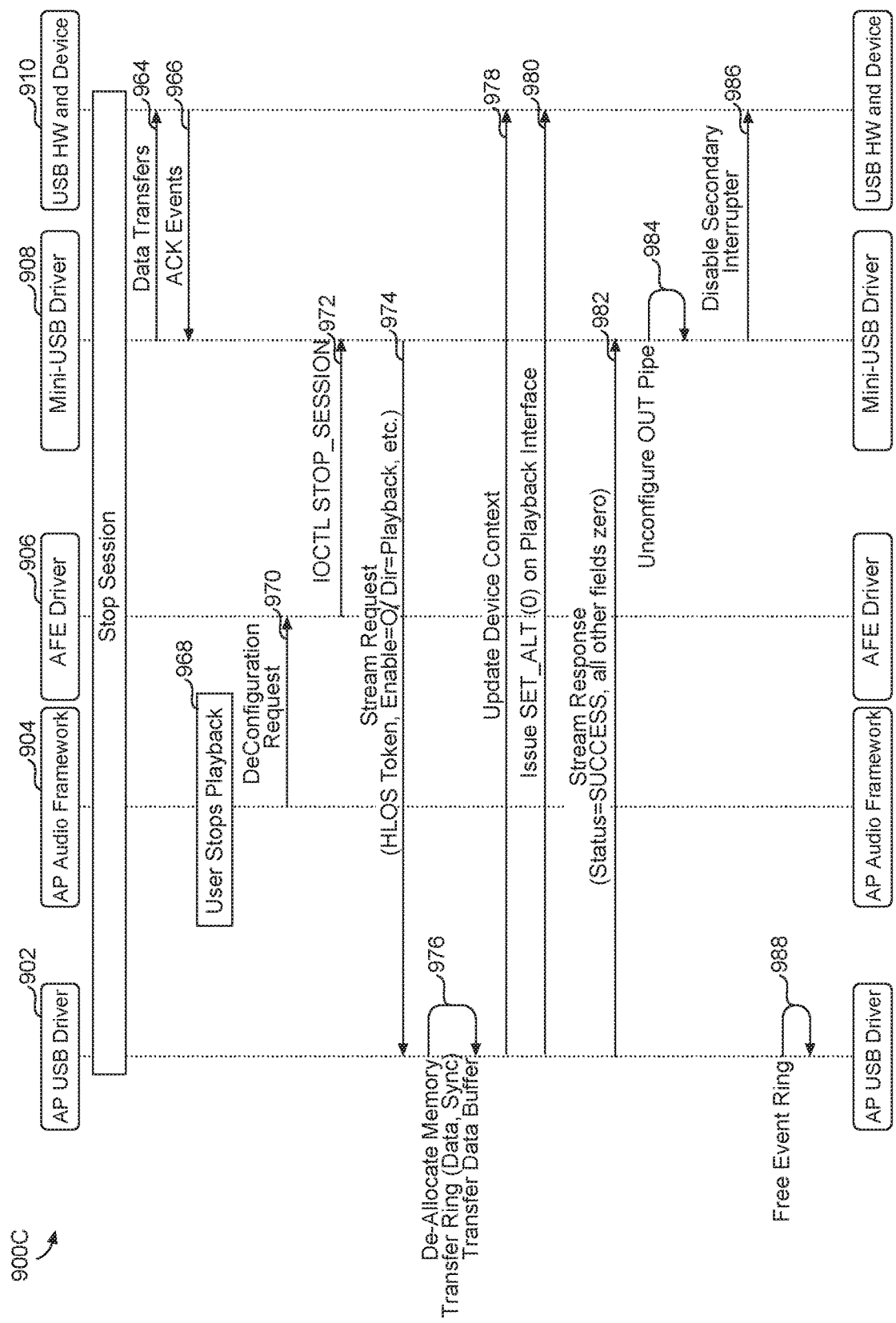

FIG. 9C illustrates a session stopping process 900C. Initially, the mini-USB driver 908 and the USB hardware 910 exchange data transfers and ACK events (signals 964 and 966, respectively). The user stops playback (block 968) and the audio framework initiates a deconfiguration request (signal 970) to the AFE driver 906. The AFE driver 906 sends a stop session command to the mini-USB driver 908 (signal 972), which sends a stream request to the USB driver 902 (signal 974). The USB driver 902 de-allocates memory, transfer ring, and the transfer data buffer (signal 976) and updates the device context with signal 978 to the USB hardware 910. Additionally, the USB driver 902 issues a command for the playback interface on the USB hardware 910 (signal 980) and provides a stream response to the mini-USB driver 908 (signal 982). The mini-USB driver 908 unconfigures the OUT pipe (signal 984) and disables the secondary interrupter (signal 986). The USB driver 902 then allows for a free event ring (signal 988).

Figure 9D:
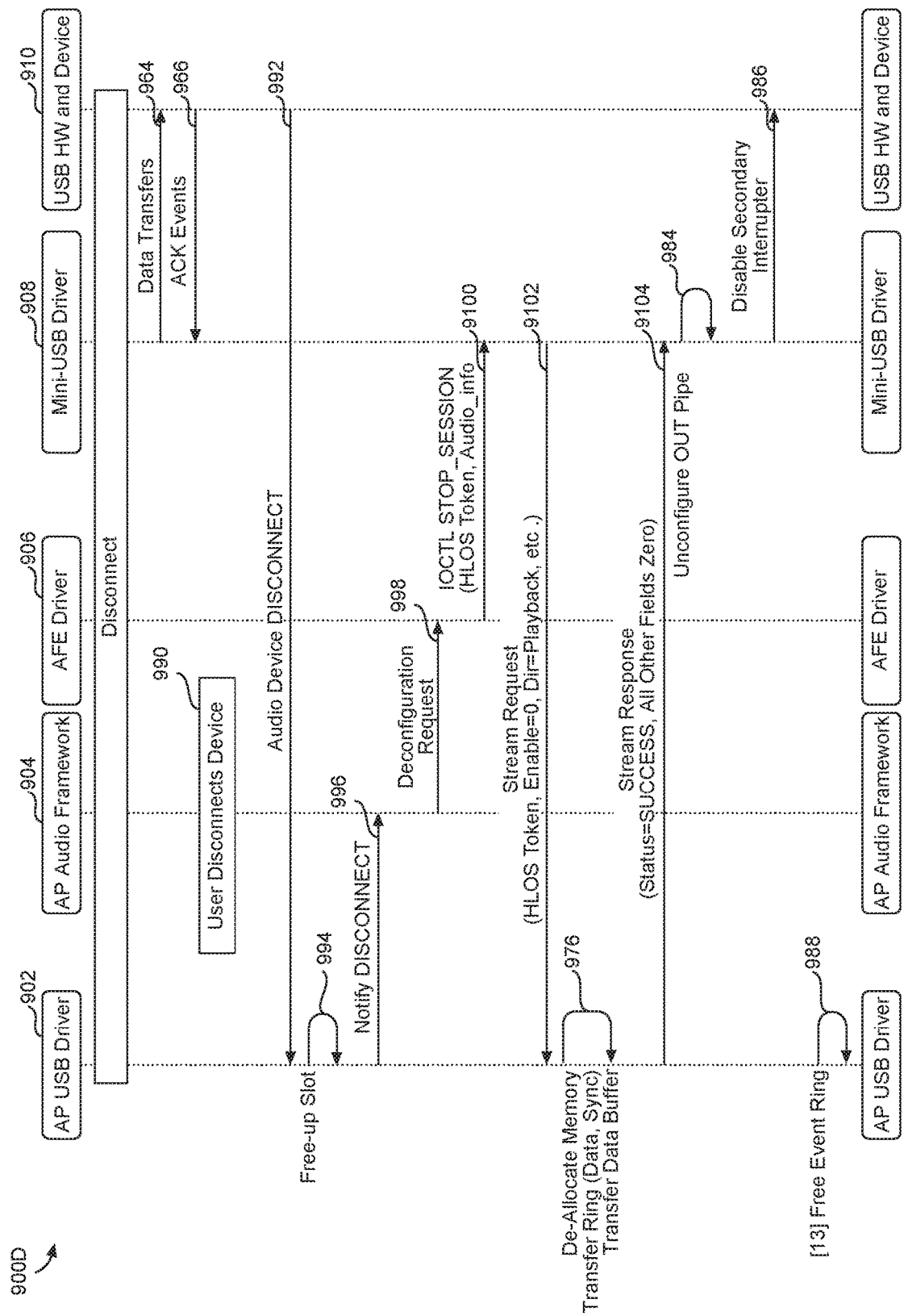

FIG. 9D illustrates a session ending through disconnection process 900D. The process 900D begins with the mini-USB driver 908 and the USB hardware 910 exchanging data transfers and ACK events (signals 964 and 966, respectively). The user disconnects the peripheral device (block 990). The USB hardware 910 sends an audio device disconnect signal 992 to the USB driver 902. The USB driver 902 advertises a free-up slot event (signal 994) and sends a notification of a disconnect to the audio framework 904 (signal 996). The audio framework 904 sends a deconfiguration request to the AFE driver 906 (signal 998), which in turn sends a stop session command to the mini-USB driver 908 (signal 9100). The mini-USB driver 908 sends a stream request to the USB driver 902 (signal 9102), which de-allocates memory, transfer ring, and transfer data buffer (signal 976). The USB driver 902 then sends a stream response to the mini-USB driver 908 (signal 9104). The mini-USB driver 908 then unconfigures the OUT pipe (signal 984) and the process 900D concludes similarly to the process 900C.

Figure 9E:
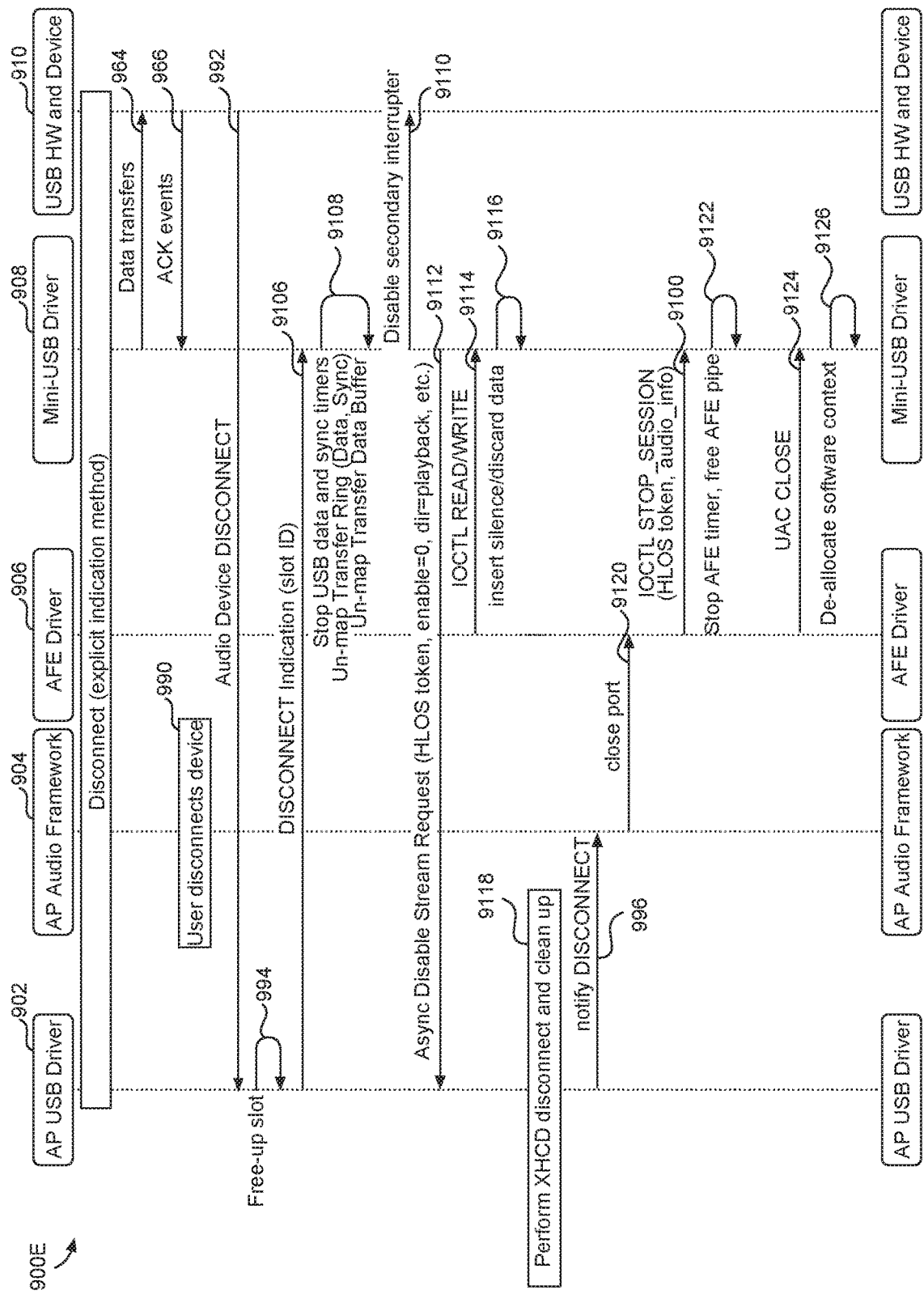

FIG. 9E illustrates a session ending through disconnection process 900E with the disconnect notification going to the ADSP mini-USB driver. The process 900E begins with the mini-USB driver 908 and the USB hardware 910 exchanging data transfers and ACK events (signals 964 and 966, respectively). The user disconnects the peripheral device (block 990). The USB hardware 910 sends an audio device disconnect signal 992 to the USB driver 902. The USB driver 902 advertises a free-up slot event (signal 994) and sends a notification of a disconnect to the mini-USB driver 908 with a slot identification (signal 9106). The mini-USB driver 908 stops USB data and sync timers and un-maps a transfer ring and data buffer (signal 9108). The mini-USB driver 908 then disables the secondary interrupter (signal 9110) and sends an asynchronous disable stream request to the USB driver 902 (signal 9112). The AFE driver 906 then sends a read/write command to the mini-USB driver (signal 9114), which inserts silence and/or discards data as appropriate (signal 9116). Meanwhile, the USB driver 902 performs a disconnect and clean up (signal 9118) and notifies the audio framework 904 of the disconnect (signal 996). The audio framework 904 then closes the appropriate port (signal 9120) at the AFE driver 906. The AFE driver 906 then sends a stop session command to the mini-USB driver 908 (signal 9100). The mini-USB driver 908 stops the AFE timer and frees the AFE pipe (signal 9122). The AFE driver 906 then sends a UAC close command (signal 9124), and the mini-USB driver 908 de-allocates the software context (signal 9126).

Figure 9F:
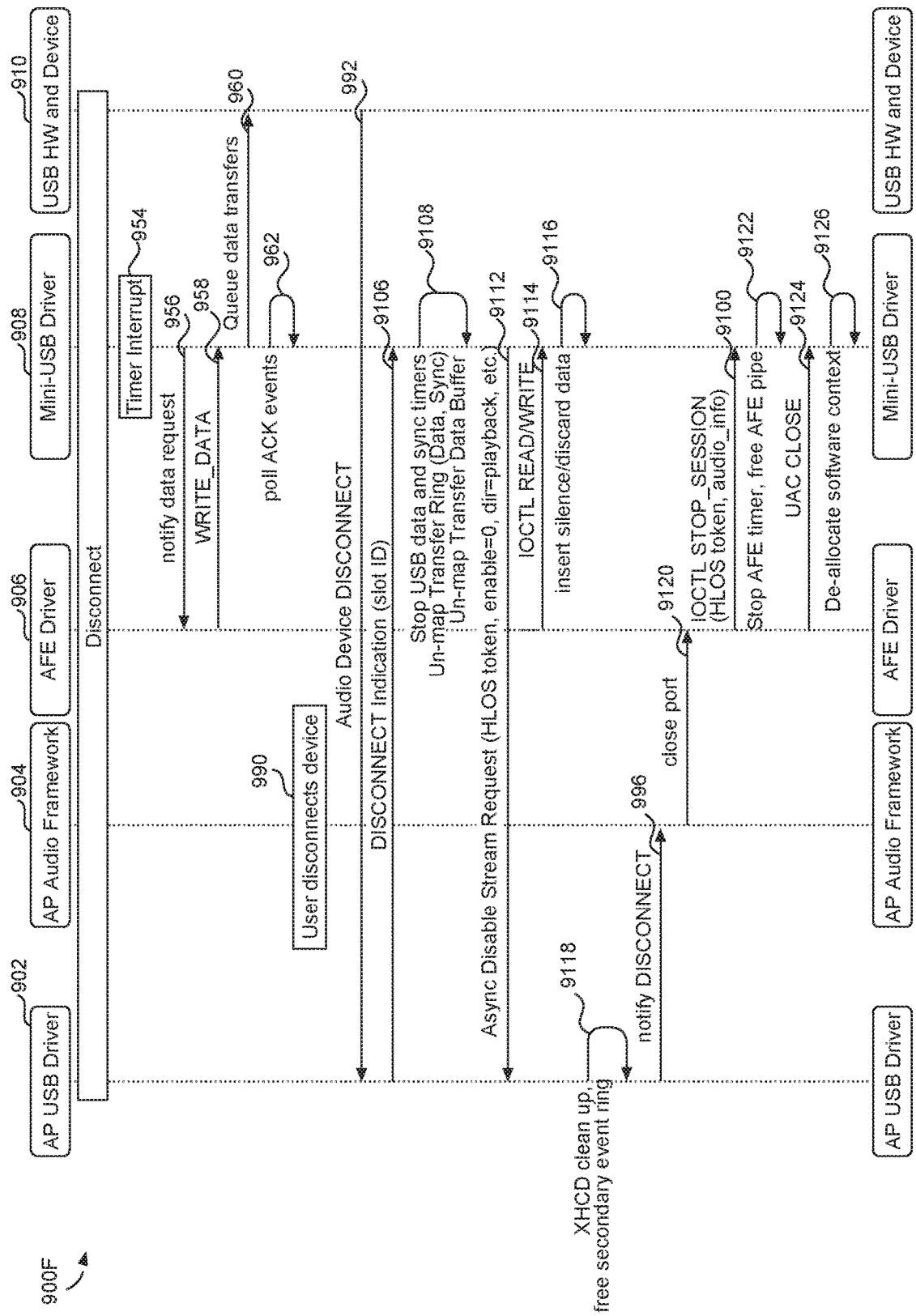

FIG. 9F illustrates process 900F for a session ending through disconnection without interrupts (i.e., using polling). The process 900F begins with a timer interrupt (block 954) with signals 956, 958, 960, and 962 (see FIG. 9B above). The user disconnects the peripheral device (block 990). The USB hardware 910 sends an audio device disconnect signal 992 to the USB driver 902. The USB driver 902 sends a notification of a disconnect to the mini-USB driver 908 with a slot identification (signal 9106). The mini-USB driver 908 stops USB data and sync timers and un-maps a transfer ring and data buffer (signal 9108). The mini-USB driver 908 sends an asynchronous disable stream request to the USB driver 902 (signal 9112). The AFE driver 906 then sends a read/write command to the mini-USB driver (signal 9114), which inserts silence and/or discards data as appropriate (signal 9116). Meanwhile, the USB driver 902 performs a disconnect and clean up (signal 9118) and notifies the audio framework 904 of the disconnect (signal 996). The audio framework 904 then closes the appropriate port (signal 9120) at the AFE driver 906. The AFE driver 906 then sends a stop session command to the mini-USB driver 908 (signal 9100). The mini-USB driver 908 stops the AFE timer and frees the AFE pipe (signal 9122). The AFE driver 906 then sends a UAC close command (signal 9124), and the mini-USB driver 908 de-allocates the software context (signal 9126). Note that the secondary interrupter does not need to be disabled since it is not present in the polling aspect.

In FIG. 9D, the disconnect notification is passed to the mini-USB driver 908 implicitly through the audio framework 904 on the USB driver 902. In contrast, in FIG. 9E, the disconnect notification is passed to the mini-USB driver 908 explicitly. The difference between FIGS. 9E and 9F lies in the lack of interrupts and the use of polling in FIG. 9F.

FIGS. 10A and 10B illustrate signal flows for a subsystem reset for a low-power processor. In FIG. 10A, a process 1000A begins with the mini-USB driver 908 and the USB hardware 910 exchanging data transfers and ACK events (signals 964 and 966, respectively). The low-power processor experiences a sub-system reset (block 1002). The USB driver 902 receives a client disconnect notification (block 1004) and begins event ring cleanup (signal 1006). The USB driver 902 disables the secondary interrupter at the USB hardware 910 (signal 1008) and disables audio streams in and out (signal 1010) at the USB hardware 910. At some future time, the low-power processor sub-system is out of reset (block 1012). The audio framework 904 receives an out of reset notification (signal 1014) and the USB driver 902 experiences a client connect notification (block 1016). In the process 1000A, the USB driver 902 reprograms ERSTBA and ESTSZ after configuration of the secondary event ring (signal 1018) and restarts the playback and/or recording (block 1020), which causes the audio framework 904 to set the configuration request to the AFE driver 906 (signal 1022). The AFE driver 906 then sends the set configuration command to the mini-USB driver 908 (signal 1024). The USB driver 902 sends a stream request to the mini-USB driver 908 (signal 1026) and allocates memory, transfer ring, and data buffer (signal 1028). The USB driver 902 then updates the device context at the USB hardware 910 (signal 1030) and issues the SET-ALT command on the playback device (signal 1032). The USB driver 902 sends a stream response to the mini-USB driver 908 (signal 1034), and the mini-USB driver 908 sets up the out/in pipe (signal 1036). The process 1000A continues similarly to the session 900 of FIG. 9A.

In contrast, in FIG. 10B, the secondary event ring is configured with the subsequent reprogramming of the ERSTBA and ERSTSZ (signal 1018A) that takes place after the restart.

While the ability to offload processing to the low-power processor provides power saving opportunities, there may be times when latency concerns override the desire for power savings. Accordingly, the present disclosure contemplates that the application processor may evaluate latency requirements and implement or skip utilization of the mini-USB driver on the low-power processor.

Figure 11:
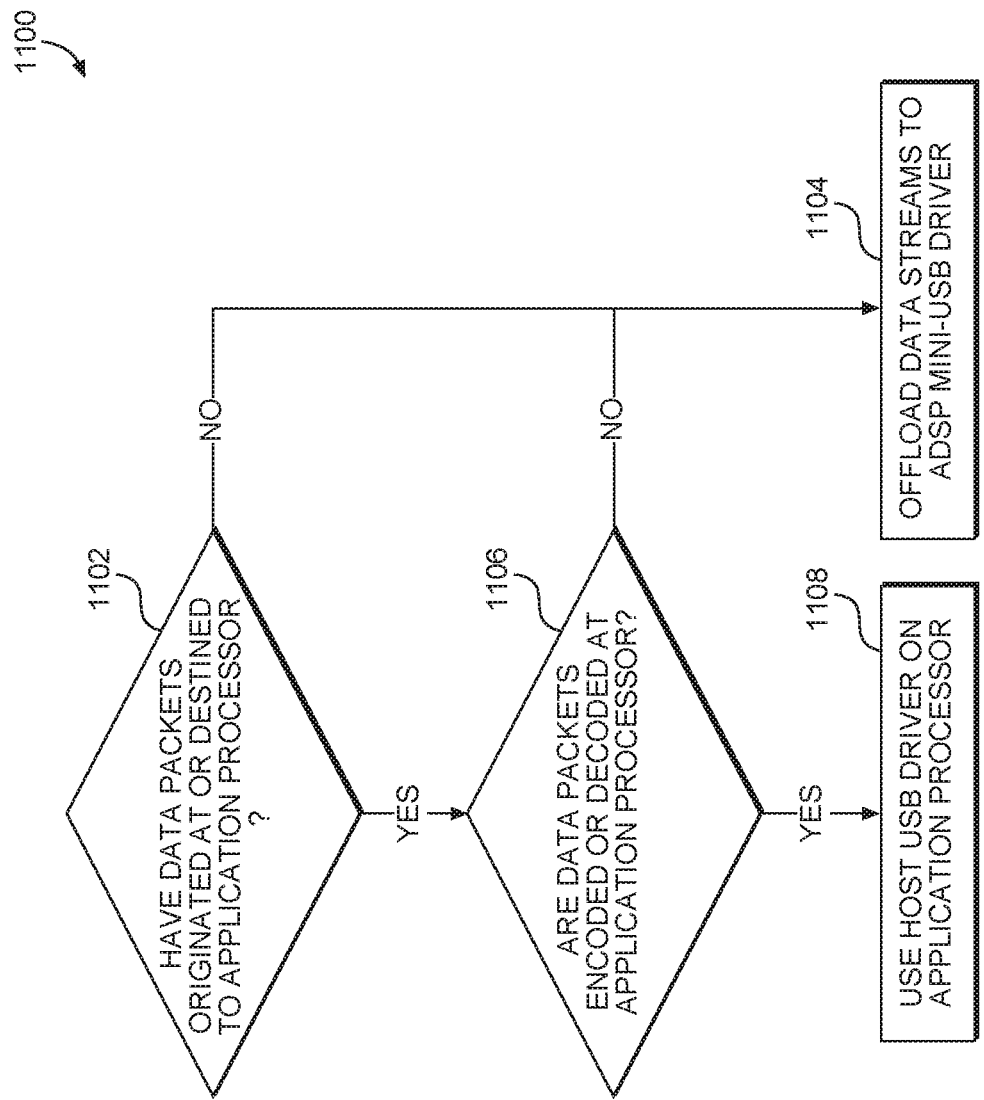
FIG. 11 is a flowchart illustrating path selection based on latency requirements.

In this regard, FIG. 11 illustrates a process 1100 that is performed at the application processor to determine whether to offload processing to the mini-USB driver. Specifically, the application processor determines whether the data packets have originated at or are destined for the application processor (block 1102). If the answer is no, then the application processor implements aspects of the present disclosure as set forth above, by offloading data streams to the mini-USB driver (block 1104). If, however, the data packets do originate at or are destined for the application processor, the application processor determines if the data packets are encoded or decoded at the application processor (block 1106). If the answer to block 1106 is no, then the application processor offloads the data streams to the mini-USB driver (block 1104). If, however, the encoding/decoding does occur at the application processor, then the application processor uses the host USB driver to process the packets (block 1108).

While the above discussion with reference to FIGS. 8, 9A-9F, 10A, 10B, and 11 has contemplated that the USB driver still has some responsibilities after hand-off, FIGS. 12A-12E illustrate various signal flows between the various elements according to exemplary aspects of the present disclosure where the mini-USB driver and the additional software interoperate at the first processor (i.e., FIG. 7). The signal flow for a set-up is provided in FIG. 12A where a USB device 1200 communicates with a host computing device 1202. The host computing device 1202 includes a class specific driver or generic xHCI driver 1204 (analogous to the USB xHCI filter driver 716 in FIG. 7), a generic interface component 1206 (analogous to the USB interface driver 720 in FIG. 7), and a mini-USB driver 1208 (analogous to the mini-USB driver 706 in FIG. 7). The signal flow begins with the generic xHCI driver 1204 reading the interrupter configuration and setting up the secondary event ring (signal 1210). The generic interface component 1206 then initiates set-up of the server for inter-processor communication (signal 1212). The mini-USB driver 1208 initiates set-up of the client for inter-processor communication (signal 1214). The USB device 1200 then connects to the computing device 1202 and sends a connection notification (signal 1216). The USB endpoint is offloaded with possible notification (signal 1218) from the generic xHCI driver 1204 to the generic interface component 1206. The generic interface component 1206 responds with an IOCTL that queries resources (signal 1220). The generic xHCI driver 1204 responds with a number of class endpoints and any class endpoint descriptor information for all endpoints (signal 1222). The generic interface component 1206 saves this information. The generic interface component 1206 enters a steady state and waits for a start stream notification from the mini-USB driver 1208 or sideband interface notifications from the host stack (signal 1224).

Figure 12A:
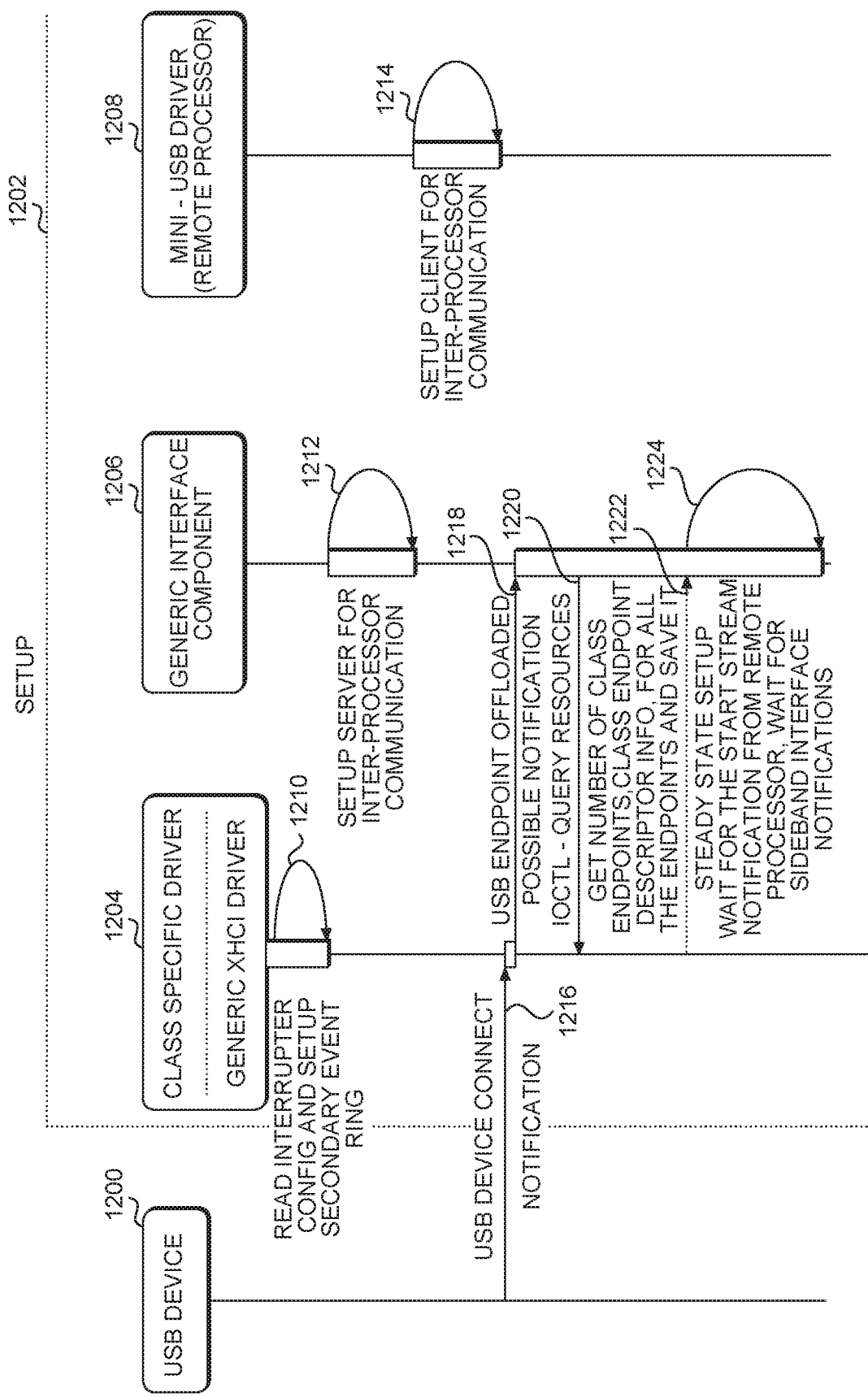
FIGS. 12A-12E illustrate various signal flows between various elements according to exemplary aspects of the present disclosure.
Figure 12B:
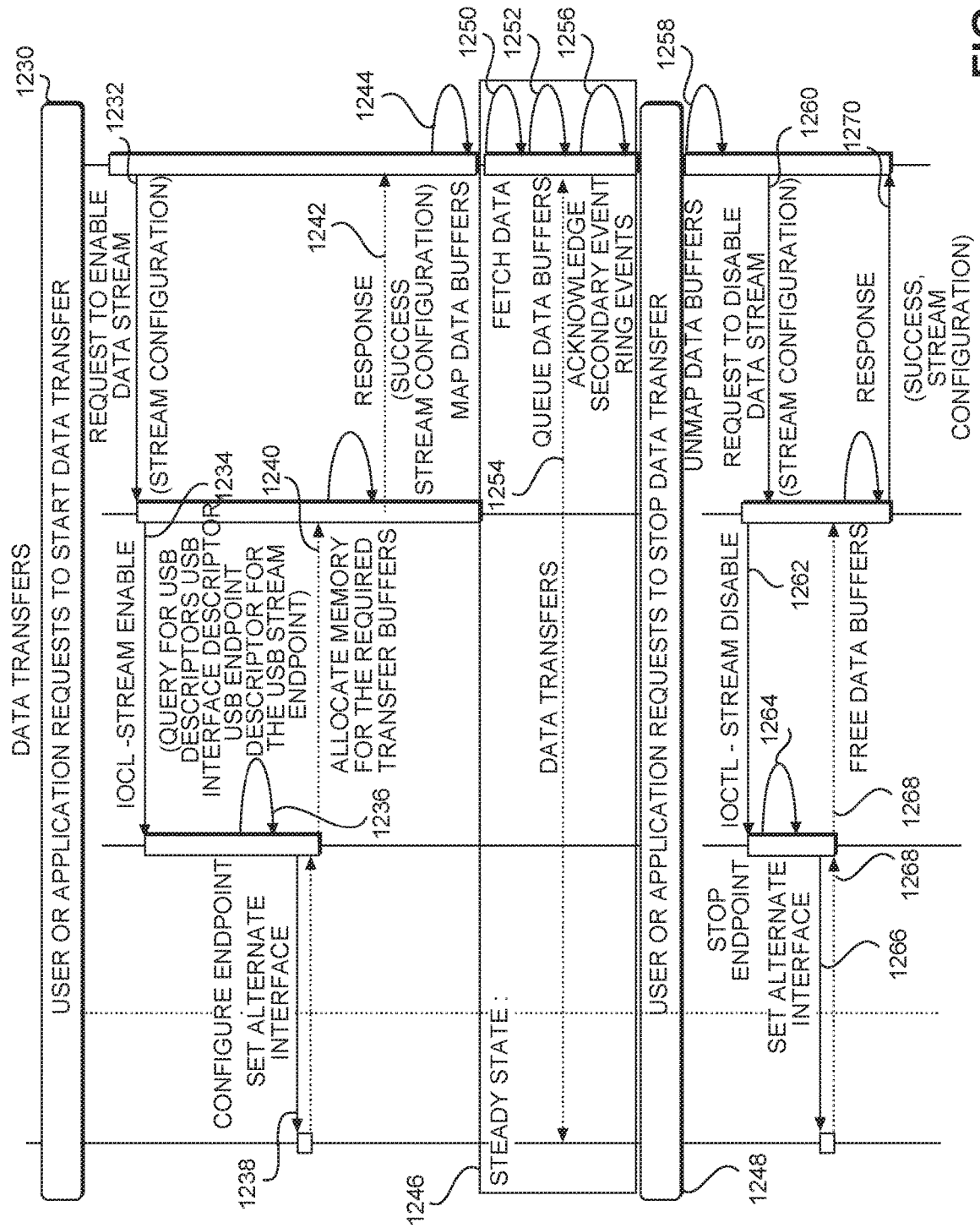

FIG. 12B illustrates the signal flows during a data transfer. The data transfer starts with the user or an application request to start the data transfer (event 1230). The mini-USB driver 1208 requests to enable a data stream (signal 1232). The generic interface component 1206 sends an IOCTL signal that enables the data stream (signal 1234) with a query for USB descriptors, a USB interface descriptor, a USB endpoint descriptor for the USB stream endpoint, and the like. The generic xHCI driver 1204 configures the endpoint (signal 1236) and sets an alternate interface (signal 1238) to the USB device 1200. The generic xHCI driver 1204 instructs the generic interface component 1206 to allocate memory for the required transfer buffers (signal 1240). Additionally, the generic interface component 1206 gets any necessary resources from the generic USB driver. The generic interface component 1206 sends a response to the mini-USB driver 1208 (signal 1242) indicating success and any stream configuration parameters. The mini-USB driver 1208 then maps the data buffers (signal 1244). The computing device 1202 enters a steady state 1246 until the user or application requests a stop (event 1248) where the mini-USB driver 1208 fetches data (signal 1250), the data buffers are queued (signal 1252), data transfers take place (signal 1254), and there is an acknowledgment of secondary event ring events (signal 1256). After the stop event 1248, the mini-USB driver 1208 unmaps the data buffers (signal 1258) and requests to disable the data stream (signal 1260). The generic interface component 1206 sends an IOCTL stream disable signal (signal 1262) and the generic xHCI driver 1204 stops the endpoint (signal 1264) and cooperates with the USB device 1200 to set an alternate interface (signal 1266). The USB device 1200 releases the data buffers by using a free data buffers signal (signal 1268), which passes to the generic interface component 1206. The generic interface component 1206 then responds to the signal 1260 with a success response (signal 1270).

Figure 12C:
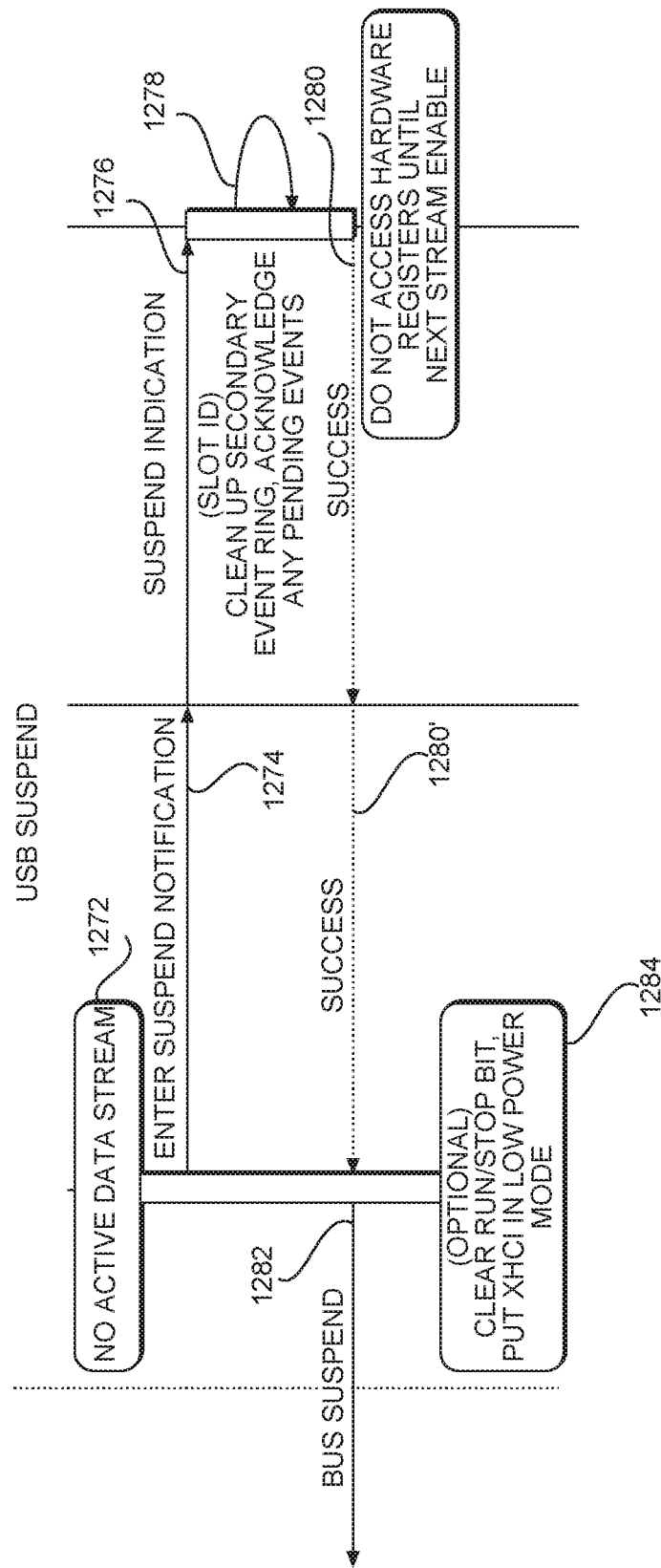

FIG. 12C illustrates a suspend operation, which begins with a no active data stream event (event 1272), which causes the generic xHCI driver 1204 to send an enter suspend notification (signal 1274), which the generic interface component 1206 sends to the mini-USB driver 1208 as a suspend indication with slot identification (signal 1276). The mini-USB driver 1208 cleans up the secondary event ring and acknowledges any pending events (signal 1278) and then sends a success signal (signal 1280), which is forwarded to the generic xHCI driver 1204 (signal 1280'). The generic xHCI driver 1204 suspends the bus (signal 1282). Optionally, the generic xHCI driver 1204 may be put into a low-power mode (event 1284).

Figure 12D:
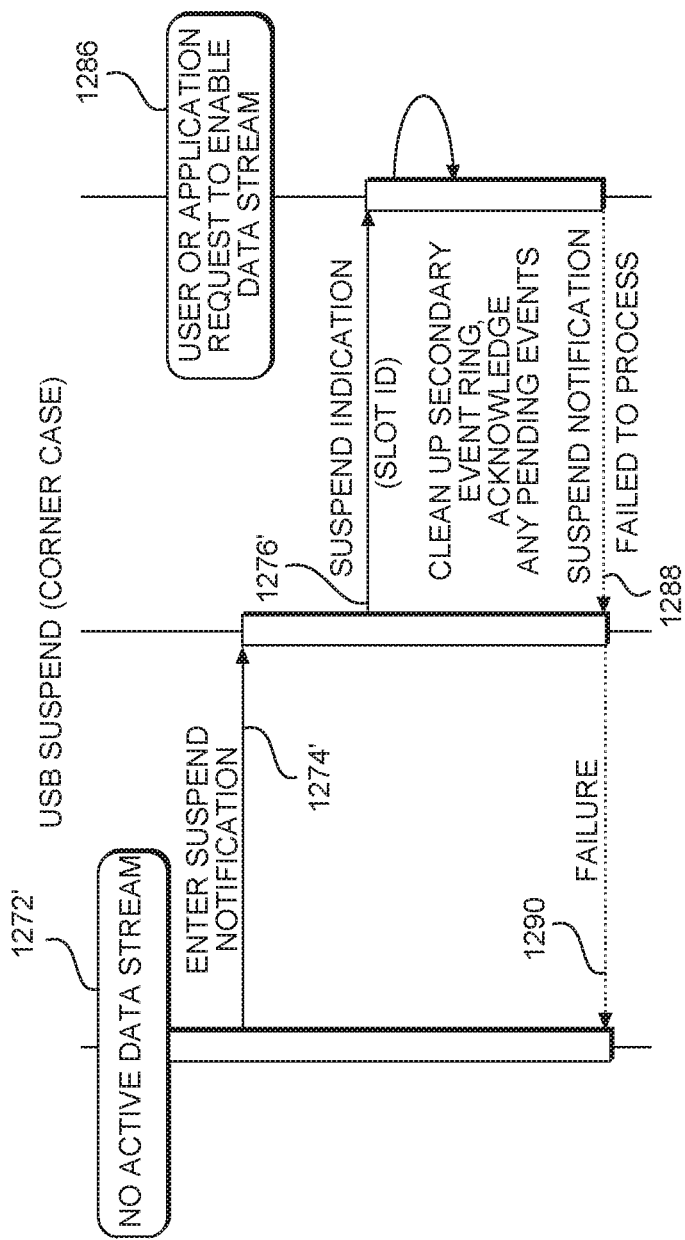

FIG. 12D illustrates a corner case suspend operation, which begins with no active data stream (event 1272'), which causes the generic xHCI driver 1204 to send an enter suspend notification (signal 1274'). Then before the generic interface component 1206 sends the suspend indication (signal 1276'), the user or application requests to enable a data stream (event 1286), which causes the mini-USB driver 1208 to begin cleaning up the secondary event ring and acknowledging any pending events (i.e., the request for a data stream), which results in a fail to process suspend notification signal (signal 1288) being sent and a failure signal (signal 1290) returned to the generic xHCI driver 1204.

Figure 12E:
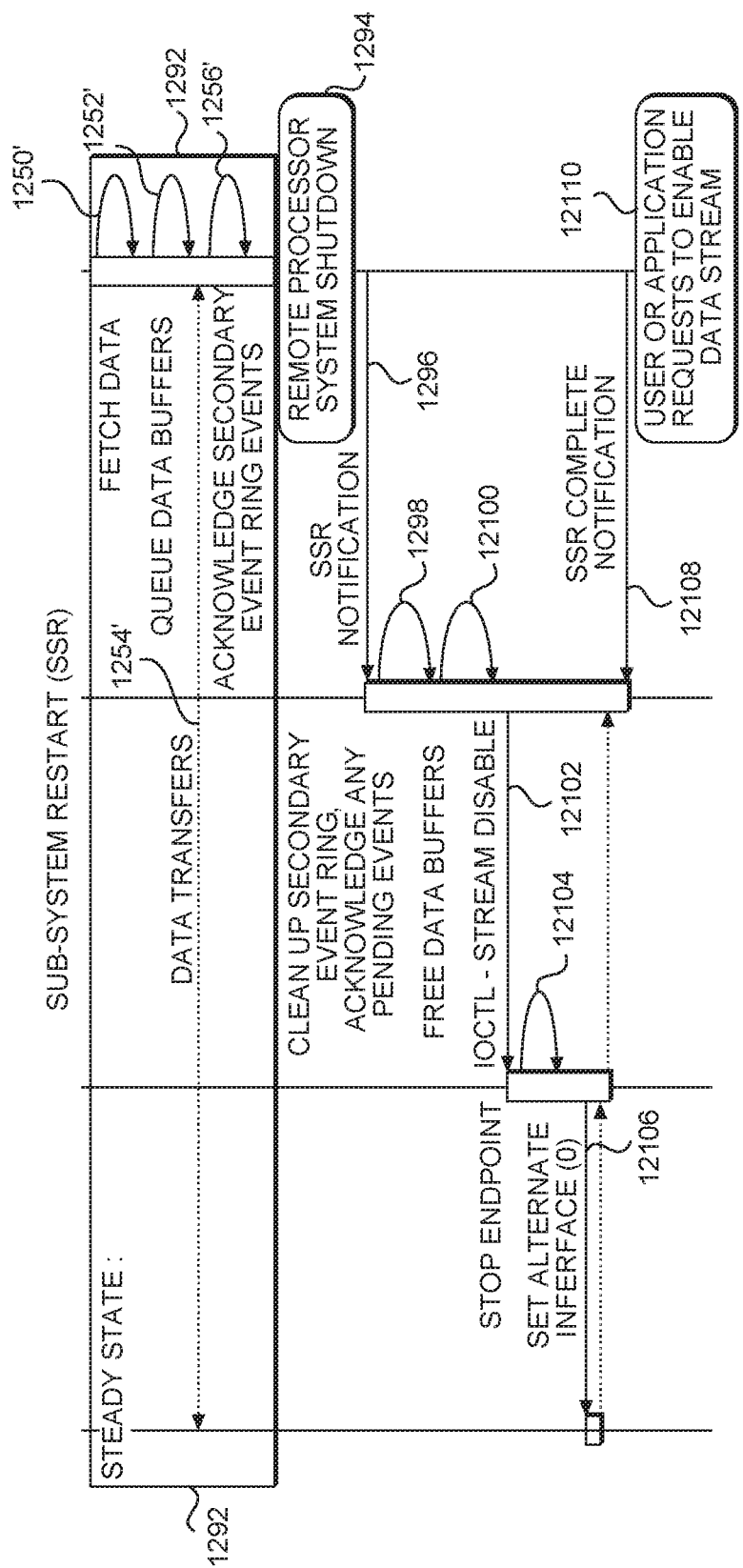

FIG. 12E illustrates a sub-system restart process. The system begins in a steady state (event 1292) where the mini-USB driver 1208 fetches data (signal 1250'), the data buffers are queued (signal 1252'), data transfers take place (signal 1254'), and there is an acknowledgment of secondary event ring events (signal 1256'). Then a remote processor system shutdown occurs (event 1294). This generates a sub-system restart (SSR) notification (signal 1296), which is an error condition in the audio processor which is unrecoverable without resetting the audio processor, which effectively causes the generic interface component 1206 to clean up the secondary ring event and acknowledge any pending events (signal 1298) and free data buffers (signal 12100) before sending an IOCTL—stream disable signal (signal 12102). The generic xHCI driver 1204 stops the endpoint (signal 12104) and sets the alternate interface (signal 12106). The mini-USB driver 1208 sends an SSR complete notification (signal 12108) and the system shuts down until a user or application requests to enable a data stream (event 12110).

The systems and methods for using distributed USB host drivers according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 13:
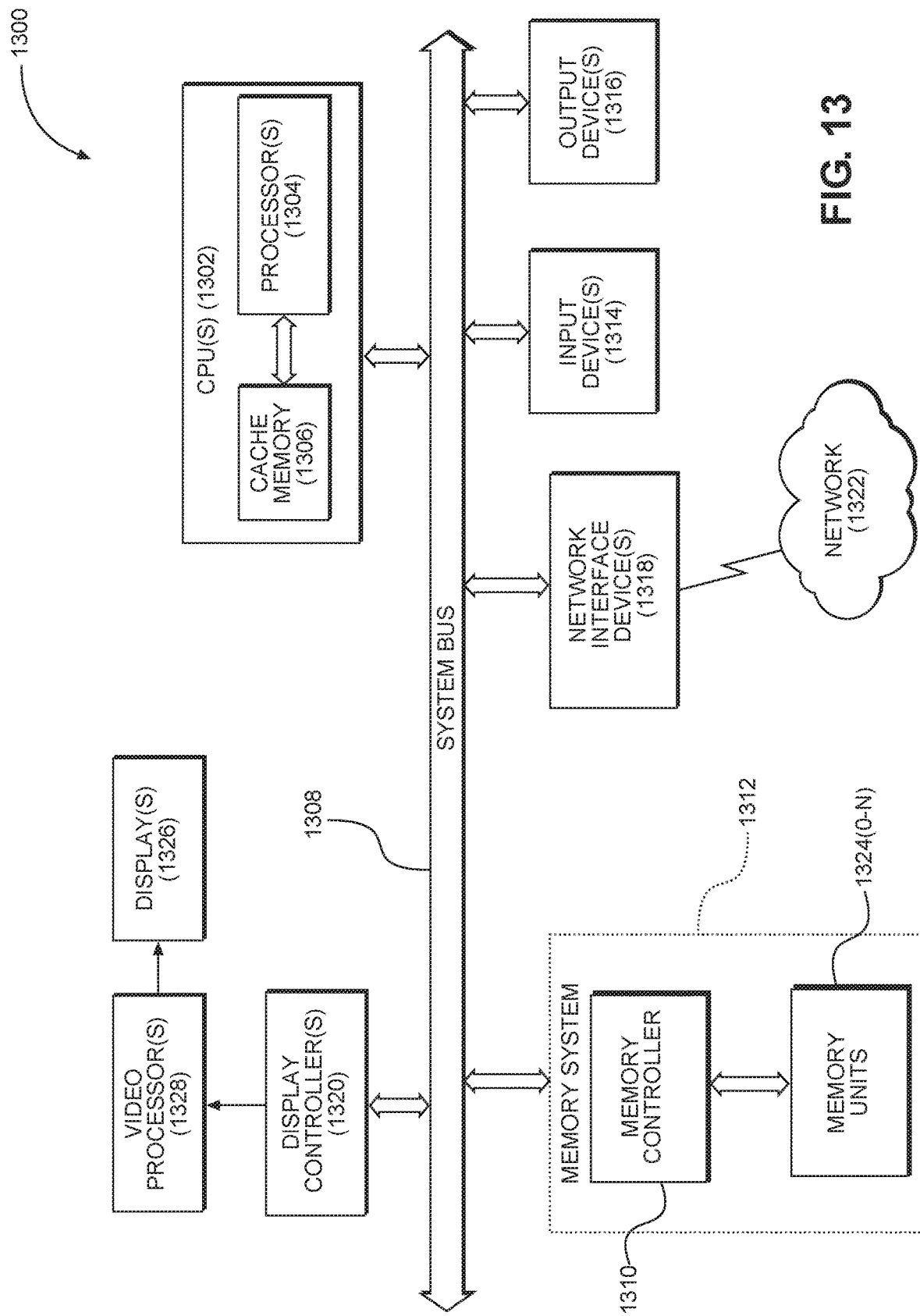
FIG. 13 is a block diagram of an exemplary processor-based system such as the mobile communication device of FIG. 1.

In this regard, FIG. 13 illustrates an example of a processor-based system 1300 that can employ the mobile communication device 100 illustrated in FIG. 1. In this example, the processor-based system 1300 includes one or more central processing units (CPUs) 1302, each including one or more processors 1304. The CPU(s) 1302 may have cache memory 1306 coupled to the processor(s) 1304 for rapid access to temporarily stored data. The CPU(s) 1302 is coupled to a system bus 1308 and can intercouple master and slave devices included in the processor-based system 1300. As is well known, the CPU(s) 1302 communicates with these other devices by exchanging address, control, and data information over the system bus 1308. For example, the CPU(s) 1302 can communicate bus transaction requests to a memory controller 1310 as an example of a slave device.

Other master and slave devices can be connected to the system bus 1308. As illustrated in FIG. 13, these devices can include a memory system 1312, one or more input devices 1314, one or more output devices 1316, one or more network interface devices 1318, and one or more display controllers 1320, as examples. The input device(s) 1314 can include any type of input device, including, but not limited to, input keys, switches, voice processors, etc. The output device(s) 1316 can include any type of output device, including, but not limited to, audio, video, other visual indicators, etc. The network interface device(s) 1318 can be any devices configured to allow exchange of data to and from a network 1322. The network 1322 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1318 can be configured to support any type of communications protocol desired. The memory system 1312 can include one or more memory units 1324(0-N).

The CPU(s) 1302 may also be configured to access the display controller(s) 1320 over the system bus 1308 to control information sent to one or more displays 1326. The display controller(s) 1320 sends information to the display(s) 1326 to be displayed via one or more video processors 1328, which process the information to be displayed into a format suitable for the display(s) 1326. The display(s) 1326 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling data streams in a Universal Serial Bus (USB) system, comprising:
   establishing a connection between an application processor and an external digital USB peripheral;
   allowing a processor to pass data packets to USB hardware through a system bus; and
   passing the data packets from the USB hardware to the external digital USB peripheral.

2. The method of claim 1, wherein establishing the connection comprises establishing a connection with a headset.

3. The method of claim 1, wherein the data packets comprise audio data packets.

4. The method of claim 1, wherein the data packets comprise multimedia packets.

5. The method of claim 1, further comprising putting the application processor in a low-power mode while the processor passes the data packets to the USB hardware.

6. The method of claim 1, further comprising having an additional USB stack at the processor controlled by a mini-USB driver.

7. The method of claim 1, wherein allowing the processor to pass the data packets to the USB hardware through the system bus comprises the application processor allowing the processor to pass the data packets; and
   wherein the USB hardware is configured to be controlled by the application processor and the processor.

8. The method of claim 1, wherein allowing the processor to pass the data packets comprises allowing a digital signal processor (DSP) to pass the data packets.

9. The method of claim 1, wherein allowing the processor to pass the data packets comprises allowing an audio digital signal processor (ADSP) to pass the data packets.

10. The method of claim 1, wherein allowing the processor to pass the data packets comprises having the processor in the same system on a chip (SoC) as the application processor.

11. The method of claim 1, further comprising distributing a USB driver between the application processor and the processor.

12. The method of claim 1, wherein allowing the processor to pass the data packets comprises using a low-power processor to pass the data packets.

13. The method of claim 6, further comprising having an interface component at the application processor.

14. The method of claim 8, wherein allowing the DSP to pass the data packets comprises using a USB driver in the DSP.

15. The method of claim 11, further comprising enumerating and configuring USB endpoints through the application processor.

16. The method of claim 13, further comprising performing clean-up functions with the mini-USB driver.

17. The method of claim 13, further comprising a host stack at the application processor and wherein the interface component allows communication from the host stack to the mini-USB driver.

18. The method of claim 15, further comprising controlling an audio stream of data packets with the processor.

19. The method of claim 18, further comprising selecting an alternate audio interface with the application processor.

20. A method of controlling a Universal Serial Bus (USB) endpoint, comprising:
- enumerating a USB endpoint with a USB driver on an application processor;
- receiving a request from a second USB driver on a second processor to enable or disable a data stream;
- responsive to the request, enabling or disabling a selected interface using control endpoints and the USB driver on the application processor;
- providing from the USB driver on the application processor to the second USB driver on the second processor a device descriptor; and
- at the second USB driver, using the device descriptor passed from the USB driver to perform data transfers.

* * * * *